United States Patent [19]

Crawford

[11] Patent Number: 5,416,614
[45] Date of Patent: May 16, 1995

[54] METHOD AND APPARATUS FOR CONVERTING DATA REPRESENTATIONS OF AN IMAGE BETWEEN COLOR SPACES

[75] Inventor: Jennifer M. Crawford, East York, Canada

[73] Assignee: IBM Corporation, Armonk, N.Y.

[21] Appl. No.: 903,031

[22] Filed: Jun. 23, 1992

[30] Foreign Application Priority Data

Jun. 28, 1991 [CA] Canada ................... 2045908

[51] Int. Cl.⁶ ..................... G06F 15/66; G06F 15/70
[52] U.S. Cl. ..................... 358/530; 345/154
[58] Field of Search ............... 358/500, 501, 524, 530, 358/400, 401, 443, 448; 345/150, 151, 152, 153, 154

[56] References Cited

U.S. PATENT DOCUMENTS

4,564,915  1/1986  Evans et al.
4,991,122  2/1991  Sanders.

FOREIGN PATENT DOCUMENTS

195786  8/1989  Japan.
284191  11/1989  Japan.
2198008  6/1988  United Kingdom.

*Primary Examiner*—Bentsu Ro
*Attorney, Agent, or Firm*—David A. Mims, Jr.; Lauren Bruzzone

[57] ABSTRACT

A method and apparatus for converting data representation of an image between a first color space and a second color space. The quality of images must be preserved in situations where further processing of the image is required. The advance made in the art is the properties directly associated with the development of tuned round-trip tables. Degradation of the image quality from the conversion process is minimal and continued conversions of the image between color spaces does not propagate a further degradation of the image quality.

5 Claims, 5 Drawing Sheets

```
;;;;;;;;;;;;;;;;;;;;;;;;;;;;;;;;;;
;       DATA AREA
;;;;;;;;;;;;;;;;;;;;;;;;;;;;;;;;;;
DATA    SEGMENT PARA PUBLIC 'DATA' ;
            *
            *
            *
RED     DB      ?               ; DEFINE STORAGE AREA FOR R VALUE.
BLUE    DB      ?               ; DEFINE STORAGE AREA FOR B VALUE.
GREEN   DB      ?               ; DEFINE STORAGE AREA FOR G VALUE.
Y       DB      ?               ; DEFINE STORAGE AREA FOR Y VALUE.
Cr      DB      ?               ; DEFINE STORAGE AREA FOR Cr VALUE.
Cb      DB      ?               ; DEFINE STORAGE AREA FOR Cb VALUE.
            *
            *
            *
DATA    ENDS                    ;

;;;;;;;;;;;;;;;;;;;;;;;;;;;;;;;;;;
;       CODE AREA
;;;;;;;;;;;;;;;;;;;;;;;;;;;;;;;;;;
CODE    SEGMENT PARA PUBLIC 'CODE' ;
            *
            *
            *
        MOV     AX,DATA         ;
        MOV     DS,AX           ;
        MOV     AX,5            ; SEQUENCE TO SET RGB=5,12,58.
        MOV     RED,AX          ; PLACE THE R VALUE OF 5 INTO MEMORY.
        MOV     AX,12           ;
        MOV     GREEN,AX        ; PLACE THE B VALUE OF 12 INTO MEMORY.
        MOV     AX,58           ;
        MOV     BLUE,AX         ; PLACE THE G VALUE OF 58 INTO MEMORY.
        CALL    RGB_YCrCb       ; CALL THE SUBROUTINE TO CONVERT RGB.
            *
            *
            *
        MOV     AX,15           ; SEQUENCE TO SET YCrCb=15,121,152.
        MOV     Y,AX            ; PLACE THE Y VALUE OF 15 INTO MEMORY.
        MOV     AX,121          ;
        MOV     Cr,AX           ; PLACE THE Cr VALUE OF 121 INTO MEMORY.
        MOV     AX,152          ;
        MOV     Cb,AX           ; PLACE THE Cb VALUE OF 152 INTO MEMORY.
        CALL    YCrCb_RGB       ; CALL THE SUBROUTINE TO CONVERT YCrCb.
            *
            *
            *
CODE    ENDS                    ;
```

*Fig. 2*

```
;;;;;;;;;;;;;;;;;;;;;;;;;;;;;;;;;;
;       RGB_YCrCb SUBROUTINE
;;;;;;;;;;;;;;;;;;;;;;;;;;;;;;;;;;
        PUSH    AX              ;
        PUSH    BX              ;
;;;;;;;;;;;;;;;;;;;;;;;;;;;;;;;;;;
;       CALCULATE Y
;;;;;;;;;;;;;;;;;;;;;;;;;;;;;;;;;;
        MOV     AX,RED          ; INDEX POINTER INTO ROUND TRIP TABLE.
        MOV     BX,USR[AX]      ; GET .299R VALUE FROM ROUND TRIP TABLES.
        MOV     AX,GREEN        ; INDEX POINTER INTO ROUND TRIP TABLE.
        ADD     BX,USG[AX]      ; ADD .587G VALUE FROM ROUND TRIP TABLES.
        MOV     AX,BLUE         ; INDEX POINTER INTO ROUND TRIP TABLE.
        ADD     BX,UCB[AX]      ; ADD .144B VALUE FROM ROUND TRIP TABLES.
        DIV     4               ; REMOVE PRECISION FACTOR OF 4.
        MOV     Y,AX            ; STORE CALCULATED Y VALUE.
;;;;;;;;;;;;;;;;;;;;;;;;;;;;;;;;;;
;       CALCULATE Cr
;;;;;;;;;;;;;;;;;;;;;;;;;;;;;;;;;;
        MOV     AX,RED          ;
        SUB     AX,Y            ; DETERMINE INDEX POINTER INTO TABLE.
        ADD     AX,128          ; ADJUST INDEX POINTER TO TABLE LOCATION
                                ; ZERO.
        MOV     BX,SRYTBL[AX]   ; GET VALUE FROM ROUND TRIP TABLES.
        MOV     Cr,BX           ; STORE CALCULATED Cr VALUE.
;;;;;;;;;;;;;;;;;;;;;;;;;;;;;;;;;;
;       CALCULATE Cb
;;;;;;;;;;;;;;;;;;;;;;;;;;;;;;;;;;
        MOV     AX,BLUE         ;
        SUB     AX,Y            ; DETERMINE INDEX POINTER INTO TABLE.
        ADD     AX,128          ; ADJUST INDEX POINTER TO TABLE LOCATION
                                ; ZERO.
        MOV     BX,SBYTBL[AX]   ; GET VALUE FROM ROUND TRIP TABLES.
        MOV     Cb,BX           ; STORE CALCULATED Cb VALUE.
;;;;;;;;;;;;;;;;;;;;;;;;;;;;;;;;;;
;       EXIT RGB_YCrCb
;;;;;;;;;;;;;;;;;;;;;;;;;;;;;;;;;;
        POP     BX              ;
        POP     AX              ;
        RET                     ;
```

Fig. 3

```
;;;;;;;;;;;;;;;;;;;;;;;;;;;;;;;;
;       YCrCb_RGB SUBROUTINE
;;;;;;;;;;;;;;;;;;;;;;;;;;;;;;;;
        PUSH    AX              ;
        PUSH    BX              ;
        PUSH    CX              ;
;;;;;;;;;;;;;;;;;;;;;;;;;;;;;;;;
;       CALCULATE R
;;;;;;;;;;;;;;;;;;;;;;;;;;;;;;;;
        MOV     AX,Cr           ; INDEX POINTER INTO ROUND TRIP TABLE.
        MOV     BX,SRCRTBL[AX]  ; GET VALUE FROM ROUND TRIP TABLE.
        MOV     AX,Y            ; GET Y VALUE.
        SUB     AX,BX           ; CALCULATE R VALUE.
        MOV     RED,AX          ; STORE CALCULATED R VALUE.
;;;;;;;;;;;;;;;;;;;;;;;;;;;;;;;;
;       CALCULATE G
;;;;;;;;;;;;;;;;;;;;;;;;;;;;;;;;
        MOV     BX,Cr           ; INDEX POINTER INTO ROUND TRIP TABLE.
        MOV     CX,Cb           ; INDEX POINTER INTO ROUND TRIP TABLE.
        MOV     AX,SGCRTBL[BX]  ; GET VALUE FROM ROUND TRIP TABLE.
        MOV     BX,SGCBTBL[CX]  ; GET VALUE FROM ROUND TRIP TABLE.
        SUB     AX,BX           ;
        DIV     2               ; REMOVE PRECISION FACTOR OF 2.
        MOV     BX,Y            ; GET Y VALUE.
        SUB     BX,AX           ;
        MOV     GREEN,BX        ; STORE CALCULATED G VALUE.
;;;;;;;;;;;;;;;;;;;;;;;;;;;;;;;;
;       CALCULATE B
;;;;;;;;;;;;;;;;;;;;;;;;;;;;;;;;
        MOV     AX,Cb           ; INDEX POINTER INTO ROUND TRIP TABLE.
        ADD     AX,128          ; ADJUST INDEX POINTER TO TABLE LOCATION
                                ; ZERO.
        MOV     BX,SBCBTBL[AX]  ; GET VALUE FROM ROUND TRIP TABLE.
        MOV     AX,Y            ; GET Y VALUE.
        SUB     AX,BX           ;
        MOV     BLUE,AX         ; STORE CALCULATED B VALUE.
;;;;;;;;;;;;;;;;;;;;;;;;;;;;;;;;
;       EXIT YCrCb_RGB
;;;;;;;;;;;;;;;;;;;;;;;;;;;;;;;;
        POP     CX              ;
        POP     BX              ;
        POP     AX              ;
        RET                     ;
```

Fig. 4

METHOD AND APPARATUS FOR CONVERTING DATA REPRESENTATIONS OF AN IMAGE BETWEEN COLOR SPACES

BACKGROUND OF THE INVENTION

1. Field of the Invention

The invention relates to a color image processing system and more particularly to a method of reversibly converting a color image between a first color space and a second color space with minimal loss of image integrity.

2. Description of the Prior Art

In the prior art it is common to convert an image from one color space to another. These conversions are necessary because the red-green-blue (RGB) color space that is used to display images on a display device such as a cathode-ray-tube (CRT) is not readily compressible when digitally recorded. To efficiently store the information, a luminance-chrominance (YCrCb) color space has been developed which enables the digital representation of the image to be much more greatly compressed. International standards have been developed for converting the representation of these different color spaces from one form to another. The Comite Consultalif International des Radiocommunications (CCIR) has established the formulas in standard CCIR 601 for converting between the luminance-chrominance (YCrCb) color space and the red-green-blue (RGB) color space. The formulas for converting RGB to YCrCb are:

$$Y = 0.299R + 0.587G + 0.114B$$

$$Cr = 0.713 (R-Y) + 128$$

$$Cb = 0.564 (B-Y) + 128$$

The formulas for converting YCrCb to RGB are:

$$R = Y + 1.402 (Cr - 128)$$

$$G = Y - 0.714 (Cr - 128) - 0.344 (Cb - 128)$$

$$B = Y + 1.772 (Cb - 128)$$

Using floating point arithmetic the conversion from one color space to the other can be achieved without loss of integrity as the calculations can be made as required to ensure that the ultimate result of any particular conversion is not subject to a rounding error. Also, such a conversion requires that each color point in each color space be convertible to a color point in the other color space. In the situation where each point of the color space is represented by three elements, such as Red, Green and Blue, each element can have one of 256 values or, in other words, the color space can represent 256×256×256=16.7 million colors. The conversion of each point to a corresponding point in the other color space can be very time consuming and requires large amounts of storage space.

One way of overcoming the time delays and storage constraints in performing the floating point conversion has been the development of a set of look-up tables whereby a point in a first color space is directly converted to a point in the second color space by looking up the corresponding value in a look-up table. For this table look-up process to provide effective and speedy conversion it is essential that the number of values in the tables and the number of tables be reduced to the minimal number necessary to enable a human viewer of an image to obtain a reasonably valid perception of the image when displayed.

The table look-up process for converting from YCrCb to RGB works satisfactorily in those situations where the image is to be converted once and then discarded, for example, when an image is printed. However, when the image is to be kept and displayed or manipulated a plurality of times where it is necessary to convert the image back and forth between the two color spaces, the quality of the image can deteriorate substantially because of rounding errors in the conversion process. As these errors compound with each conversion the quality of the resulting image becomes less and less acceptable.

The image distortion is similar to the following problem with photocopying a sample of text many times. A clean original sample of text on a page may be photocopied and will produce an accurate copy of the page. If you then photocopy the copy, a copy is produced with some amount of distortion. As you continue to photocopy the resultant copies, the distortion of the original sample increases with each copy until the point where the text becomes illegible.

The present invention compensates for the rounding errors by providing a process for generating and tuning the color space conversion look-up tables to maintain the reproducability of each original color point. Application of the look-up tables for converting YCrCb data into RGB data stabilizes 99.07% of the RGB data after the first conversion. The remaining 0.93% of the RGB data stabilizes after four conversions, ie. distortion will not propagate. For converting RGB data into YCrCb data, 99.93% of the YCrCb data stabilizes after the first conversion. The remaining 0.07% of the YCrCb data stabilizes after 3 conversions, again preventing propagation of errors.

It is accordingly a primary object of the present invention to enable multiple conversions of an image between one color space and another with minimal distortion to the data representation of the image.

A particular object is to provide multiple conversions of an image stored in YCrCb color space to an RGB color space and back to YCrCb color space without propagating any distortion to the data representation of the image.

It is a further object to tune look-up tables for conversion of images between RGB and YCrCb color spaces so that the image information is substantially stable over an infinite number of conversions.

It is a further object to apply the look-up tables in a computer program for converting image data within a micro-processor based system.

SUMMARY OF THE INVENTION

These and other objects of the present invention are achieved by generating a set of tables for converting data from a first color point in a color space to a corresponding color point in the other color space. The conversion of data is repeated a sufficient number of times to enable distortion errors from one conversion to the next to be detectable.

In the case where the color space is represented by 256 distinct values for each color point, the conversion process would be for RGB, 256×256×256=16.7 million conversions. After the conversion has been run n number of times, where n is sufficient to enable changes to be detectable, the values of the RGB color points and the YCrCb color points that do not compare from conversion to conversion identify points that must be changed or tuned. Each identified point is analyzed to determine the direction the point has moved between conversion n and conversion n−1. As a consequence of the analysis, the table look-up points for the identified points are adjusted accordingly and the conversion process repeated until such time as no values in the table change between conversions.

Additionally, the accuracy of the conversion process can be substantially enhanced initially by minimizing the rounding errors in the conversion process. This is achieved by increasing the precision for each component by multiplying each component by a suitable multiplying factor such as 2 or 4 when calculating the table value and then dividing the result by the multiplying factor to more precisely select the appropriate table value.

The invention provides an improved process for transforming a first form of color representation and a second form of color representation using look-up tables to represent said colors consisting of the steps of:
a) transforming all colors in said first form of color representation using said look-up tables to said second form of color representation
b) transforming all color in said second form of color representation transformed during said first transforming step to said first form of color representation,
repeating said steps a) and b) a plurality of times,
comparing the results of each subsequent transformation to the results of previous representations and where said results do not compare, altering said representation so as to compensate for said non-comparison and
retrying said transformation steps until said transformations do not alter.

The invention also provides a processor for processing images comprising first an image processor comprising first means for storing images in a first color space, second means for storing images in a second color space, a first storage means for storing a first set of tuned tables for converting an image stored in a first color space to an image stored in a second color space, a second storage means for storing a second set of tuned tables for converting an image stored in said second color space to an image stored in said first color space, first addressing means for addressing said tables in said first storage means in response to image information received from said first means for storing, said tables in said first storage means providing an output representative of said image information in said second color space, second addressing means for addressing said tables in said second storage means in response to image information received from said second means for storing, said tables in said second storage means providing an output representative of said image information in said first color space, whereby an image can be repetitively converted from one color space to the other with no loss of integrity in the image.

BRIEF DESCRIPTION OF THE DRAWINGS

FIG. 2 is a partial computer program illustrating a data setup and conversion from RGB to YCrCb, and then from RGB back to YCrCb.

FIG. 3 is a computer program subroutine illustrating the conversion from RGB to YCrCb applying the round-trip tables.

FIG. 4 is a computer program subroutine illustrating the conversion from YCrCb to RGB applying the round-trip tables.

In the following detailed description certain specific terminology is used for the sake of clarity and specific examples and embodiments are described. For example, the invention is described in relation to the conversion between YCrCb and RGB color spaces whereas it may be equally useful in converting between other color spaces. It is understood that the invention is not intended to be limited and should not be so construed, inasmuch as the invention is capable of many forms and variations as defined within the scope of the appended claims.

As set forth hereinabove, a primary object of the present invention is to enable reversible conversion between two representations of an image in color space where look-up tables are used to represent the conversion between the two color spaces. In the case where the image is to be represented in either the YCrCb color space or the RGB color space a total of 9 tables have been selected as sufficient to convert the image points. 5 tables are used for converting the image from RGB to YCrCb and 4 tables for converting from YCrCb to RGB.

The generation of the look-up tables involves the conversion from RGB to YCrCb and the conversion from YCrCb to RGB. In a preferred embodiment, the first conversion is from an input of three bytes per color point. Each byte represents a red, green or blue component for each color point. The resulting output from these bytes selecting values from the tables is a three byte output representative of the Y, Cr and Cb components of the color point. Each byte consists of 8 bits which can represent up to 256 distinct values. In the preferred embodiment, the representations of R,G,B,Y,Cr and Cb allow up to 256 valid levels for each component.

Process for Generating Round-Trip Tables

Figure 1A:
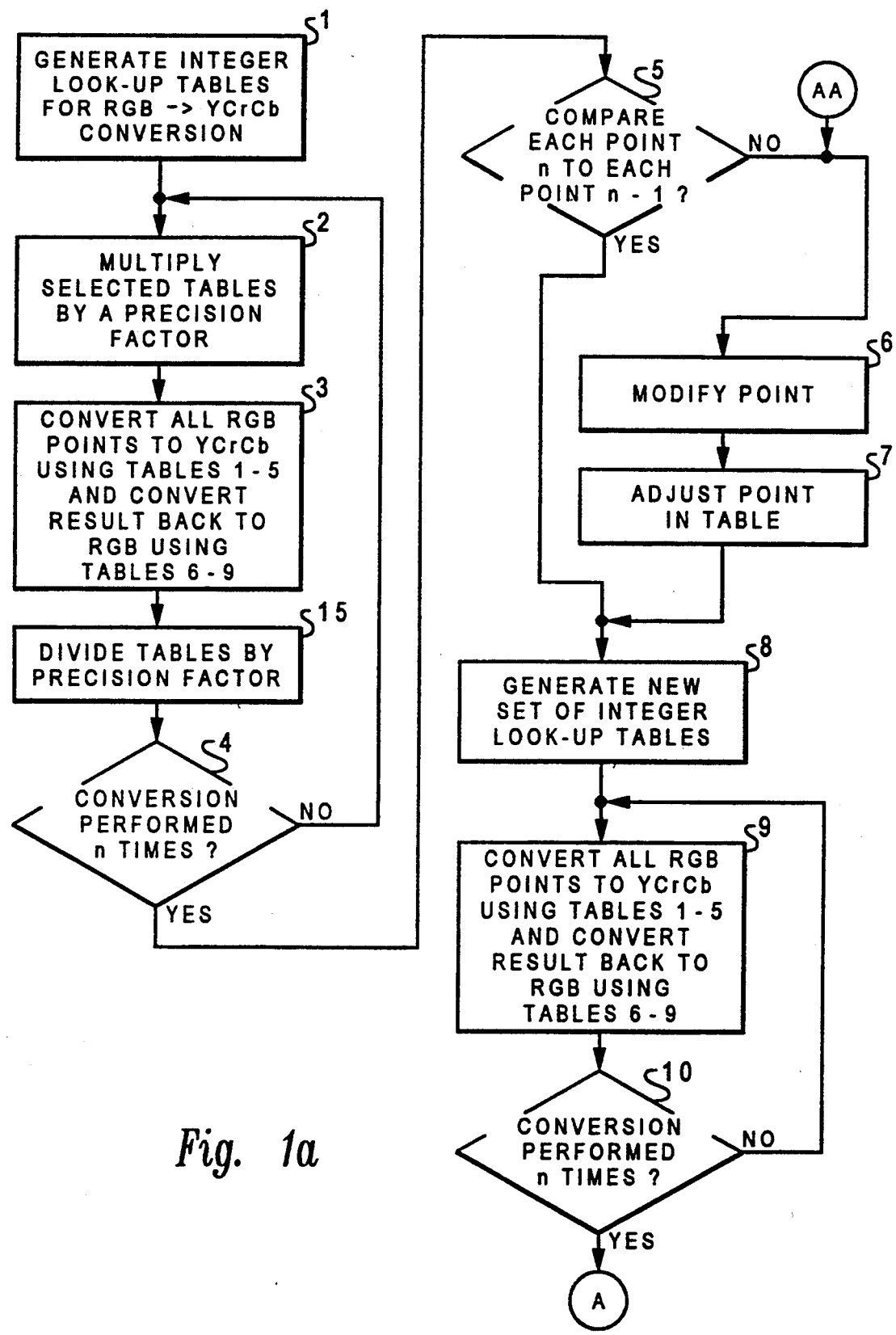
FIGS. 1a and 1b show a flow diagram of the process of generating and tuning tables for converting between the RGB color space and the YCrCb color space.
Figure 1B:
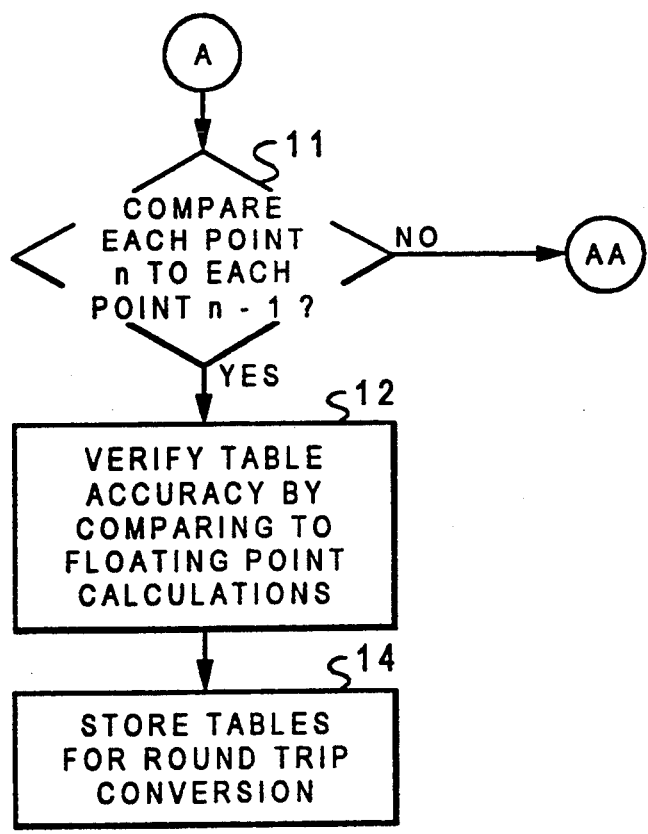

The overall process for generating a set of reusable integer look-up tables for conversion of image information between the RGB color space and the CrCb color space is illustrated by the flow diagram shown in FIG. 1.

As illustrated at 1, a set of integer look-up tables are generated. For conversion between RGB and YCrCb, a set of 9 tables is required. One table represents all valid values of 0.299R, one all valid values of 0.587G, one all valid values of 0.114B, the fourth, all valid values of 0.713(R−Y)+128, the fifth, all valid values of 0.564(B−Y)+128, the sixth for 1.402(Cr−128), the seventh for 0.714(Cr−128), the eighth for 0.344(Cb−128), and the ninth for 1.772(Cb−128).

These tables are selected so as to approximate the floating point calculations needed to conform to the CCIR 601 formulas for converting between RGB to YCrCb which are:

$$Y = 0.299R + 0.587G + 0.114B$$

$$Cr = 0.713\,(R - Y) + 128$$

$Cb = 0.564(B-Y) + 128$ $R = Y + 1.402(Cr - 128)$ $G = Y - 0.714(Cr - 128) - 0.344(Cb - 128)$ $B = Y + 1.772(Cb - 128)$ for $0 = <R,G,B,Y,Cr,Cb< = 255$, a range bounded by a byte, or 8 bits.

After each point in each of the nine tables is determined, as illustrated at 2, selected tables are multiplied by a fixed factor so as to ensure that any error created by rounding off of the calculations to an integer value is minimized. For the RGB to YCrCb conversion, the R, G and B tables are multiplied by 4 to increase the precision of the table values.

Then at 3, all combinations of R, G and B (all RGB points) are converted to YCrCb using the look-up tables and then back to RGB.

As indicated at 4, the conversion procession is repeated a plurality of times. Although the number of times can be any number, the inventor has found that repeating the conversion process 5 times is usually adequate.

After the conversion is performed the selected number of times, the generated values from application of the tables between the last and second last conversion cycle are compared. Although this is the preferred manner of identifying the problem points, as it minimizes the number of problem points, other comparisons such as between the 3rd and the 5th conversion could be used.

The points in the tables that do not compare are modified as indicated at 6.

Performance of this modification requires that the nature of the variance in the problem point from conversion cycle to conversion cycle be understood. This involves identifying the components of the CCIR equations and how the components relate to each other. A simple analysis of the components on their own is performed. The problem points are ordered in accordance with the value of the components that produced them. Where a specific value of a component occurs a large number of times within the set of problem points, then that component is identified as a candidate for modification. In addition, the distribution of the combinations of components is analyzed to find any combination of values that occur a large number of times.

After the points selected for modification are identified, the value in the look-up table is adjusted either upwardly or downwardly depending upon:

1) The direction in which the problem point at n is moving from the corresponding point at n−1 and
2) The direction the problem point at n is away from the corresponding original floating point value as compared to the same point n−1 was in relation to the floating point value.
3) The direction the problem point is moving from the specific iteration of the point, ie n.
4) The existence of a "hole" in the table data, for example the following values 195, 196, 198, 199 have a hole between 196 and 198 so that either 196 or 198 could be tuned with a value of 197.

As illustrated at 8, a new set of modified integer look-up tables is generated and the conversion and comparison steps repeated as indicated at 10 and 11. The process can be repeated a number of times until a stabilized set of integer look-up tables has been generated, however, the inventor has found that performing the conversion and comparison steps twice was sufficient to provide a stabilized set of tables for the RGB to YCrCb conversion.

The invention will be more fully understood from the following explanation of specific examples of the application of the inventive concepts.

The tables generated for converting from RGB to YCrCb in accordance with the CCIR 601 formulas are as follows:

| Entry | Red Y Table (R × 0.299) Calculation | Value | Green Y Table (G × 0.587) Calculation | Value | Blue Y Table (B × .114) Calculation | Value |
|---|---|---|---|---|---|---|
| 0 | 0 × .299 | 0 | 0 × 0.587 | 0 | 0 × 0.114 | 0 |
| 1 | 1 × .299 | 0 | 1 × 0.587 | 1 | 1 × 0.114 | 0 |
| 2 | 2 × .299 | 1 | 2 × 0.587 | 2 | 2 × 0.114 | 0 |
| . | | | | | | |
| 255 | 255 × .299 | 76 | 255 × 0.587 | 150 | 255 × 0.114 | 29 |

The look-up table values for Cr are based on the value of (R−Y) and is bounded by valid Cr values. The range of the table for valid Cr values is from −179 to +178. The table is as follows:

| Entry | Cr Table 0.713 × (R − Y) + 128 Calculation | Value |
|---|---|---|
| −179 | 0.713 × (−179) + 128 | 0 |
| −178 | 0.713 × (−178) + 128 | 0 |
| −177 | 0.713 × (−177) + 128 | 2 |
| . | | |
| −1 | 0.713 × (−1) + 128 | 127 |
| 0 | 0.713 × (0) + 128 | 128 |
| 1 | 0.713 × (1) + 128 | 129 |
| . | | |
| 176 | 0.713 × (176) + 128 | 253 |
| 177 | 0.713 × (177) + 128 | 254 |
| 178 | 0.713 × (178) + 128 | 255 |

The look-up table values for Cb is based on the value of (B−Y) and is bounded by valid Cb values. The range of valid Cb values is from −227 to +226. The table is as follows:

| Entry | Cb Table 0.564 × (B − Y) + 128 Calculation | Value |
|---|---|---|
| −227 | 0.564 × (−227) + 128 | 0 |
| −226 | 0.564 × (−226) + 128 | 1 |

Cb Table
0.564 × (B − Y) + 128

| Entry | Calculation | Value |
|---|---|---|
| −225 | 0.564 × (−225) + 128 | 1 |
| . | | |
| −1 | 0.564 × (−1) + 128 | 127 |
| 0 | 0.564 × (0) + 128 | 128 |
| 1 | 0.564 × (1) + 128 | 129 |
| . | | |
| 224 | 0.564 × (224) + 128 | 254 |
| 225 | 0.564 × (225) + 128 | 255 |
| 226 | 0.564 × (226) + 128 | 256 |

The accuracy of the table look-up procedure can be substantially improved if the tables are multiplied by a fixed factor. This procedure then reduces the errors resulting from rounding off the floating point numbers from which the look-up tables are derived. For example, the Red, Green and Blue tables for converting to Y are multiplied by four and after the R, G and B table values are added together the resultant is divided by four and rounded upward if the rounding value is greater than or equal to 0.75. The look-up tables as modified by the fixed factor 4 would be as follows:

| | Red Y Table 4 × (R × 0.299) | | Green Y Table 4 × (G × 0.587) | | Blue Y Table 4 × (B × 0.114) | |
|---|---|---|---|---|---|---|
| Entry | Calculation | Value | Calculation | Value | Calculation | Value |
| 0 | 4 × (0 × 0.299) | 0 | 4 × (0 × 0.587) | 0 | 4 × (0 × 0.114) | 0 |
| 1 | 4 × (1 × 0.299) | 1 | 4 × (1 × 0.587) | 2 | 4 × (1 × 0.114) | 0 |
| 2 | 4 × (2 × 0.299) | 2 | 4 × (2 × 0.587) | 5 | 4 × (2 × 0.114) | 1 |
| . | | | | | | |
| 255 | 4 × (255 × 0.299) | 305 | 4 × (255 × 0.587) | 599 | 4 × (255 × 0.114) | 116 |

Using these tables the Y value for a particular entry point is selected by summing the 4×0.299R, 4×0.587G and 4×0.144B values from the tables and dividing the result by 4 and rounding the result off at 0.75. For example, if the entry point for the R value is 136, the R value from the table would be 4×(136×0.299)=162, if the entry point for the G value were 212, the G value from the table would be 4×(212×0.587)=498 and if the entry point for the B value were 36, the B value from the table would be 4×(36×0.114)=16 where the value for R was 162.656 and is rounded to 162, G was 497.776 and is rounded to 498 and B was 16.416 and is rounded to 16. The sum of the values for R, G and B (162+498+16) is 676 and is then divided by 4 to give a value for Y of 169.

In a similar manner, integer look-up tables for converting from YCrCb to RGB are also constructed in accordance with the CCIR 601 formulas. This conversion from YCrCb to RGB uses four look-up tables. The input to the look-up tables comprises three bytes, one for each of the Y, Cr and Cb components. The output from the tables is three bytes, one for each of the components R, G and B. One look-up table indexed by 1.402(Cr−128) is used to generate R. The R table is constructed as follows:

R Table
1.402 × (Cr-128)

| Entry | Calculation | Value |
|---|---|---|
| −128 | 1.402 × −128 | −179 |
| −127 | 1.402 × −127 | −178 |
| . | | |
| −1 | 1.402 × −1 | −1 |
| 0 | 1.402 × 0 | 0 |
| 1 | 1.402 × 1 | 1 |
| . | | |
| 126 | 1.402 × 126 | 177 |
| 127 | 1.402 × 127 | 178 |

To obtain the integer value for R, the integer value for Y is added to the look-up result from the R table.

The look-up table for calculating B is indexed by 1.772(Cb−128) and is based on the following table:

B Table
1.772 × (Cb-128)

| Entry | Calculation | Value |
|---|---|---|
| −128 | 1.772 × −128 | −226 |
| −127 | 1.772 × −127 | −225 |
| . | | |
| −1 | 1.772 × −1 | −2 |
| 0 | 1.772 × 0 | 0 |
| 1 | 1.772 × 1 | 2 |
| . | | |
| 126 | 1.772 × 126 | 223 |
| 127 | 1.772 × 127 | 225 |

To calculate the integer value for B, the value for Y is added to the table value for the corresponding Cr value.

The calculation of the G value requires two look-up tables. The first table is indexed by 0.714(Cr−128) and the second table by 0.344(Cb−128). Also, to improve the accuracy of the conversion (double roundoff error), the G tables are multiplied by a fixed factor. In the preferred imbodiment, the multiplication factor of 2 has provided satisfactory results for the G tables. The tables are as follows:

G Cr Table
2 × (0.714 × (Cr-128))

| Entry | Calculation | Value |
|---|---|---|
| −128 | 2 × (0.714 × (−128)) | −183 |
| −127 | 2 × (0.714 × (−128)) | −181 |
| . | | |

G Cr Table
$2 \times (0.714 \times (Cr-128))$

| Entry | Calculation | Value |
|---|---|---|
| . | | |
| −1 | $2 \times (0.714 \times (-1))$ | −1 |
| 0 | $2 \times (0.714 \times (0))$ | 0 |
| 1 | $2 \times (0.714 \times (1))$ | 1 |
| . | | |
| 126 | $2 \times (0.714 \times (126))$ | 180 |
| 127 | $2 \times (0.714 \times (127))$ | 181 |

G Cb Table
$2 \times (0.344 \times (Cb-128))$

| Entry | Calculation | Value |
|---|---|---|
| −128 | $2 \times (0.344 \times (128))$ | −88 |
| −127 | $2 \times (0.344 \times (128))$ | −88 |
| . | | |
| −1 | $2 \times (0.344 \times (-1))$ | 0 |
| 0 | $2 \times (0.344 \times (0))$ | 0 |
| 1 | $2 \times (0.344 \times (1))$ | |
| . | | |
| 126 | $2 \times (0.344 \times (126))$ | 86 |
| 127 | $2 \times (0.344 \times (127))$ | 87 |

As with the tables for converting from RGB to Y, the tables for converting from Cr and Cb to G are rounded up if the calculation leaves a decimal remainder of 0.75 or greater and down otherwise.

The G value is calculated by summing the values for the corresponding Cr and Cb values from the above tables, dividing the resulting sum by two and subtracting that value from the corresponding value for Y.

When the complete set of tables for converting RGB to YCrCb and YCrCb to RGB are completed, each of the $256 \times 256 \times 256 = 16,777,216$ possibilities for every combination of each set of tables are computed. The calculations for each set of tables are performed a plurality of times so as to enable identification of any of the combinations which continue to change as a result of rounding errors occurring during the conversion.

After the round-trip conversion has been performed a plurality of n times, the points within the integer look-up tables that have changed from one conversion to the next are identified. The particular technique used to identify the problem points is to compare the n value of the point to the (n−1) value. When the integer values are found to differ, the integer value in the table is changed either to a next greater or a next lower value depending upon whether the value of the point is increasing or decreasing between conversion cycles (n−1) and (n) and whether the value is moving towards or away from the corresponding precisely calculated floating point value for the original point between conversion cycles (n−1) and (n).

To better illustrate this concept a small portion of the round-trip calculations between RGB and YCrCb is illustrated by the following example and reference to the tables 1 through 9 shown in Appendix A.

Starting with the RGB color point 15, 10, 112, the results of converting between RGB and YCrCB four times follows:

$RGB_1 = 15, 10, 112$ $YCrCb_1 = 23, 122, 178$ $RGB_2 = 15, 11, 112$ $YCrCb_2 = 24, 122, 178$ $RGB_3 = 16, 12, 113$ $YCrCb_3 = 25, 122, 178$ $RGB_4 = 17, 13, 114$ $YCrCb_4 = 26, 122, 178$

The results clearly indicate the color points are not stable as the G value distorts after the first iteration, which then causes additional distortion at the third iteration of R and B. The distortion from these untuned tables is propagating without any limit.

Start $R_1 = 15, G_1 = 10, B_1 = 112$
- $4R(15) = 18$, from table 1.
- $4G(10) = 23$, from table 2.
- $4B(112) = 51$, from table 3.

$4Y_1 = 18 + 23 + 51$
$= (92 + 1)/4$ (note, +1 o provide a 3/4 rounding.)
$Y_1 = 23$ $Cr_1 = RY(15 - 23 = -8) = 122$   $RY(-8) = 122$, from table 4.

$Cb_1 = BY(112 - 23 = 89) = 178$   $BY(89) = 178$, from table 8.

Therefore $Y = 23, Cr = 122, Cb = 178$

Now, convert $YCrCb_1$ back to $RGB_2$ $R_2 = 23 + RCr(122 - 128) = 15$, from table 5

$G_2 = 23 - ((2GCr + 2GCb) >> 1)$, from table 6
$= 23 - ((-9 + 34) >> 1) = 25 >> 1 = 12$
$= 11$ $B_2 = 23 + BCb(178 - 128 - 50)89$, from table 9
$= 112$ At this point, after the first conversion, G has moved. R and B are correct, but the movement in G may cause the next calculation of Y to move.

Start the second conversion.

$4Y_2 = 18 + 26 + 51 = 95$, again from table 1, 2, 3
$= (95 + 1)/4 = 96$
$Y_2 = 24$
$Cr_2 = RY(15 - 24 - 9) = 122$, again from table 4
$Cb_2 = BY(112 - 24 = 88) = 178$, again from table 8

Now convert $YCrCb_2$ to $RGB_3$ $R_3 = 24 + RCr(122 - 128)$, again from table 5
$= 24 - 8$
$= 16$ (note, G change rippled through to R)

$G_3 = 24 - ((GCr(122) + GCb(178) >> 2)$, again from table 6
$= 24 - (-9 + 34 >> 2 = 25 >> 2 = 12$
$= 12$ (note, G has changed again)

$B_3 = 24 + (BCb(178 - 128) = 89)$, again from table 9
$= 113$ (note, G change rippled through to B)

From the above results, it would appear that the problem point is with the first production of G. We know that G has increased in order for that to occur, either Y is too large (which we know it is not) or the 2GCr+2GCb part is too small.

$Cr-128=122-128=-6$ $GCr(-6)$ *table value is* $-9$
*floating point value is* $-8.5680$ $Cb-128=178-128=50$ $GCb(50)$ *table value is* $34$
*floating point value is* $34.4$ Therefore $(2GCr+2GCb)=(-9+34)=25$
$fp2GCr+fp2GCb=-8.5680+34.4=25.83$ and because the precision of 2 is added, we must divide by 2

$25/2=12$ $25.83/2=12.916$

Therefore the table value is probably off in one or both of the tables which makes both a candidate for tuning. If, for example, both positions were tuned:

$Gcr(-6)=-8$ $GCb(50)=35$

Then from the first conversion above $$R = 23 + RCr(-6)\\ = 23 - 8\\ = 15$$

$$G = 23 - ((GCr + GCb >> 1)\\ = 23 - (-8 + 35 >> 1)\\ = 23 - \_27 >> 1 = 13)\\ = 10$$

$$B = 23 + 89\\ = 112$$

and for the next conversion Y is back to its original value $4Y=18+23+51$ $Y=23$ $Cr=R-4(15-23=-8)=122$ $Cb=B-4(112-23=89)=178$ In summary,
2GCr($-6$) was tuned to $-9$ and is now tuned to $-8$
2GCb(50) was tuned to 34 and is now tuned to 35

This adjustment process is carried out for each problem point in the tables. After each problem point is adjusted, the newly generated set of tables are put through the conversion process again and any changes after n cycles are again noted and adjusted. The process can be repeated the number of times necessary to obtain complete stabilization of the tables.

Generated Round-Trip Tables

As each problem point is identified and corrected, the tables become closer and closer to being tuned so that continuous round-trip conversions from one set of tables to the other does not create a change or propagate a distortion in the data value. At this stage, the tables stabilize and the final set of tables can be used to convert an image representation between the YCrCb color space and the RGB color space without any deterioration in the quality of the resulting image. The final set of round-trip tables generated by this described process are shown in Table 10 through Table 18 of Appendix A.

Application of Round-Trip Tables

An example conversion from a RGB color point to an YCrCb color point follows using the data from the final tables (10 through 18) starting with a RGB color point of 5, 12, 58. We determine Y from Table 10, the value indexed by R=5 is 6, from Table 11, the value indexed by G=12 is 28, and from Table 12, the value indexed by B=58 is 26. Therefore Y=(6+28+26)/4, or Y=15. Note, division by 4 is required to remove the encoded precision from the table entries.

Next, we determine a value of Cr. To determine the index into Table 13, the value or R−Y must be determined which in this example is 5−15=−10. The value of Cr is determined by starting at the table location 0 point and indexing back to find Cr=121.

Finally, we determine a value of Cb. To determine the index into Table 8, the value B−Y must be determined, which in this example is 58−15=43. The value of Cb is determined by starting at the table location 0 point and indexing forward to find Cb=152.

Therefore for a RGB color point of 5, 12, 58 we have a YCrCb color point of 15, 121, 152. As a check of the results, the actual equations yield the following:

$Y=0.299(5)+0.587(12)+0.114(58)=15.3,$
$Cr=0.713(5-15.3)=120.6$ and
$Cb=0.564(58-15.3)=152.1$ Now, the example will continue the round-trip and convert the YCrCb color point back to the original RGB color point. Continuing with YCrCB of 15, 121, 152 we first determine R. The index into Table 14 is Cr=121. Starting from the table location 0 point, the value from the table is −10. Therefore, R=Y−10=15−10=5. Note with this value there is zero distortion from the resultant round-trip.

Next we determine a value of G. The index into Table 15 is Cr=121 and the index into Table 16 is Cb=152. The respective values from these tables are −10 and 17. Therefore G=Y−(−10)/2−(17)/2=15+5−8=12. Again, note this value has zero distortion from the resultant round-trip.

Finally, we determine a value of B. The index into Table 18 is Cb=152 and the value from the table is 43. Therefore B=Y+43=15+43=58, noting zero distortion from the resultant round-trip.

The conversion process between the RGB color point and the YCrCb color point may be embodied in a computer program. FIG. 2 illustrates a partical data area with a setup and call sequence to complete a pair of color point conversions using the round-trip tables 10 through 18. FIG. 3 illustrates an example subroutine to execute the RGB conversion to YCrCB and FIG. 4 illustrates an example subroutine to execute the YCrCb conversion to RGB.

The tables generated and tuned by the present invention assure reproducible, repeatable results while preserving the color quality of a stored image. In short, the tables minimize divergence of subsequent reproductions of an image from its original stored state and a stable state of the image is reached after a fixed minimal number of conversions. The use of integer value look-up tables also ensures that conversions between RGB and YCrCb can be performed very rapidly. These qualities are very useful in applications such as image editors and image processing systems where image data, compressed in the YCrCb color space, must be translated to the RGB color space before any display screen editing can be performed and then translated back to the YCrCb color space so that the image can be stored in an efficiently and reproducibly compressed state.

TABLE 1

APPENDIX A static USHORT usR[256] = {   //untuned

| | | | | | | | |
|---|---|---|---|---|---|---|---|
| 0, | 1, | 2, | 4, | 5, | 6, | 7, | 8, |
| 10, | 11, | 12, | 13, | 14, | 16, | 17, | 18, |
| 19, | 20, | 22, | 23, | 24, | 25, | 26, | 28, |
| 29, | 30, | 31, | 32, | 33, | 35, | 36, | 37, |
| 38, | 39, | 41, | 42, | 43, | 44, | 45, | 47, |
| 48, | 49, | 50, | 51, | 53, | 54, | 55, | 56, |
| 57, | 59, | 60, | 61, | 62, | 63, | 65, | 66, |
| 67, | 68, | 69, | 71, | 72, | 73, | 74, | 75, |
| 77, | 78, | 79, | 80, | 81, | 83, | 84, | 85, |
| 86, | 87, | 89, | 90, | 91, | 92, | 93, | 94, |
| 96, | 97, | 98, | 99, | 100, | 102, | 103, | 104, |
| 105, | 106, | 108, | 109, | 110, | 111, | 112, | 114, |
| 115, | 116, | 117, | 118, | 120, | 121, | 122, | 123, |
| 124, | 126, | 127, | 128, | 129, | 130, | 132, | 133, |
| 134, | 135, | 136, | 138, | 139, | 140, | 141, | 142, |
| 144, | 145, | 146, | 147, | 148, | 149, | 151, | 152, |
| 153, | 154, | 155, | 157, | 158, | 159, | 160, | 161, |
| 163, | 164, | 165, | 166, | 167, | 169, | 170, | 171, |
| 172, | 173, | 175, | 176, | 177, | 178, | 179, | 181, |
| 182, | 183, | 184, | 185, | 187, | 188, | 189, | 190, |
| 191, | 193, | 194, | 195, | 196, | 197, | 199, | 200, |
| 201, | 202, | 203, | 205, | 206, | 207, | 208, | 209, |
| 210, | 212, | 213, | 214, | 215, | 216, | 218, | 219, |
| 220, | 221, | 222, | 224, | 225, | 226, | 227, | 228, |
| 230, | 231, | 232, | 233, | 234, | 236, | 237, | 238, |
| 239, | 240, | 242, | 243, | 244, | 245, | 246, | 248, |
| 249, | 250, | 251, | 252, | 254, | 255, | 256, | 257, |
| 258, | 260, | 261, | 262, | 263, | 264, | 266, | 267, |
| 268, | 269, | 270, | 271, | 273, | 274, | 275, | 276, |
| 277, | 279, | 280, | 281, | 282, | 283, | 285, | 286, |
| 287, | 288, | 289, | 291, | 292, | 293, | 294, | 295, |
| 297, | 298, | 299, | 300, | 301, | 303, | 304, | 305 |

};

TABLE 2 static USHORT usG[256] = {   // untuned

| | | | | | | | |
|---|---|---|---|---|---|---|---|
| 0, | 2, | 5, | 7, | 9, | 12, | 14, | 16, |
| 19, | 21, | 23, | 26, | 28, | 31, | 33, | 35, |
| 38, | 40, | 42, | 45, | 47, | 49, | 52, | 54, |
| 56, | 59, | 61, | 63, | 66, | 68, | 70, | 73, |
| 75, | 77, | 80, | 82, | 85, | 87, | 89, | 92, |
| 94, | 96, | 99, | 101, | 103, | 106, | 108, | 110, |
| 113, | 115, | 117, | 120, | 122, | 124, | 127, | 129, |
| 131, | 134, | 136, | 139, | 141, | 143, | 146, | 148, |
| 150, | 153, | 155, | 157, | 160, | 162, | 164, | 167, |
| 169, | 171, | 174, | 176, | 178, | 181, | 183, | 185, |
| 188, | 190, | 193, | 195, | 197, | 200, | 202, | 204, |
| 207, | 209, | 211, | 214, | 216, | 218, | 221, | 223, |
| 225, | 228, | 230, | 232, | 235, | 237, | 239, | 242, |
| 244, | 247, | 249, | 251, | 254, | 256, | 258, | 261, |
| 263, | 265, | 268, | 270, | 272, | 275, | 277, | 279, |
| 282, | 284, | 286, | 289, | 291, | 293, | 296, | 298, |
| 301, | 303, | 305, | 308, | 310, | 312, | 315, | 317, |
| 319, | 322, | 324, | 326, | 329, | 331, | 333, | 336, |
| 338, | 340, | 343, | 345, | 348, | 350, | 352, | 355, |
| 357, | 359, | 392, | 364, | 366, | 369, | 371, | 373, |
| 376, | 378, | 380, | 383, | 385, | 387, | 390, | 392, |
| 394, | 397, | 399, | 402, | 404, | 406, | 409, | 411, |
| 413, | 416, | 418, | 420, | 423, | 425, | 427, | 430, |
| 432, | 434, | 437, | 439, | 441, | 444, | 446, | 448, |
| 451, | 453, | 456, | 458, | 460, | 463, | 465, | 467, |
| 470, | 472, | 474, | 477, | 479, | 481, | 484, | 486, |
| 488, | 491, | 493, | 495, | 498, | 500, | 502, | 505, |
| 507, | 510, | 512, | 514, | 517, | 519, | 521, | 524, |
| 526, | 528, | 531, | 533, | 535, | 538, | 540, | 542, |
| 545, | 547, | 549, | 552, | 554, | 556, | 559, | 561, |
| 564, | 566, | 568, | 571, | 573, | 575, | 578, | 580, |
| 582, | 585, | 587, | 589, | 592, | 594, | 596, | 599, |

TABLE 2-continued static USHORT usG[256] = {   // untuned

};

TABLE 3 static UCHAR ucB[256] = {   // untuned

| | | | | | | | |
|---|---|---|---|---|---|---|---|
| 0, | 0, | 1, | 1, | 2, | 2, | 3, | 3, |
| 4, | 4, | 5, | 5, | 5, | 6, | 6, | 7, |
| 7, | 8, | 8, | 9, | 9, | 10, | 10, | 10, |
| 11, | 11, | 12, | 12, | 13, | 13, | 14, | 14, |
| 15, | 15, | 16, | 16, | 16, | 17, | 17, | 18, |
| 18, | 19, | 19, | 20, | 20, | 21, | 21, | 21, |
| 22, | 22, | 23, | 23, | 24, | 24, | 25, | 25, |
| 26, | 26, | 26, | 27, | 27, | 28, | 28, | 29, |
| 29, | 30, | 30, | 31, | 31, | 31, | 32, | 32, |
| 33, | 33, | 34, | 34, | 35, | 35, | 36, | 36, |
| 36, | 37, | 37, | 38, | 38, | 39, | 39, | 40, |
| 40, | 41, | 41, | 41, | 42, | 42, | 43, | 43, |
| 44, | 44, | 45, | 45, | 46, | 46, | 47, | 47, |
| 47, | 48, | 48, | 49, | 49, | 50, | 50, | 51, |
| 51, | 52, | 52, | 52, | 53, | 53, | 54, | 54, |
| 55, | 55, | 56, | 56, | 57, | 57, | 57, | 58, |
| 58, | 59, | 59, | 60, | 60, | 61, | 61, | 62, |
| 62, | 62, | 63, | 63, | 64, | 64, | 65, | 65, |
| 66, | 66, | 67, | 67, | 67, | 68, | 68, | 69, |
| 69, | 70, | 70, | 71, | 71, | 72, | 72, | 73, |
| 73, | 73, | 74, | 74, | 75, | 75, | 76, | 76, |
| 77, | 77, | 78, | 78, | 78, | 79, | 79, | 80, |
| 80, | 81, | 81, | 82, | 82, | 83, | 83, | 83, |
| 84, | 84, | 85, | 85, | 86, | 86, | 87, | 87, |
| 88, | 88, | 88, | 89, | 89, | 90, | 90, | 91, |
| 91, | 92, | 92, | 93, | 93, | 93, | 94, | 94, |
| 95, | 95, | 96, | 96, | 97, | 97, | 98, | 98, |
| 98, | 99, | 99, | 100, | 100, | 101, | 101, | 102, |
| 102, | 103, | 103, | 104, | 104, | 104, | 105, | 105, |
| 106, | 106, | 107, | 107, | 108, | 108, | 109, | 109, |
| 109, | 110, | 110, | 111, | 111, | 112, | 112, | 113, |
| 113, | 114, | 114, | 114, | 115, | 115, | 116, | 116 |

};

TABLE 4 static SHORT sRyTbl[512] = {   // UNTUNED

| | | | | | | | |
|---|---|---|---|---|---|---|---|
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 1, | 2, |
| 3, | 3, | 4, | 5, | 5, | 6, | 7, | 8, |
| 8, | 9, | 10, | 10, | 11, | 12, | 12, | 13, |
| 14, | 15, | 15, | 16, | 17, | 17, | 18, | 19, |
| 20, | 20, | 21, | 22, | 22, | 23, | 24, | 25, |
| 25, | 26, | 27, | 27, | 28, | 29, | 30, | 30, |
| 31, | 32, | 32, | 33, | 34, | 35, | 35, | 36, |
| 37, | 37, | 38, | 39, | 40, | 40, | 41, | 42, |
| 42, | 43, | 44, | 45, | 45, | 46, | 47, | 47, |
| 48, | 49, | 50, | 50, | 51, | 52, | 52, | 53, |
| 54, | 55, | 55, | 56, | 57, | 57, | 58, | 59, |
| 60, | 60, | 61, | 62, | 62, | 63, | 64, | 65, |
| 65, | 66, | 67, | 67, | 68, | 69, | 70, | 70, |
| 71, | 72, | 72, | 73, | 74, | 75, | 75, | 76, |
| 77, | 77, | 78, | 79, | 80, | 80, | 81, | 82, |
| 82, | 83, | 84, | 85, | 85, | 86, | 87, | 87, |
| 88, | 89, | 89, | 90, | 91, | 92, | 92, | 93, |
| 94, | 94, | 95, | 96, | 97, | 97, | 98, | 99, |
| 99, | 100, | 101, | 102, | 102, | 103, | 104, | 104, |
| 105, | 106, | 107, | 107, | 108, | 109, | 109, | 110, |
| 111, | 112, | 112, | 113, | 114, | 114, | 115, | 116, |
| 117, | 117, | 118, | 119, | 119, | 120, | 121, | 122, |
| 122, | 123, | 124, | 124, | 125, | 126, | 127, | 127, |
| 128, | 129, | 129, | 130, | 131, | 132, | 132, | 133, |
| 134, | 134, | 135, | 136, | 137, | 137, | 138, | 139, |
| 139, | 140, | 141, | 142, | 142, | 143, | 144, | 144, |
| 145, | 146, | 147, | 147, | 148, | 149, | 149, | 150, |

TABLE 4-continued static SHORT sRyTbl[512] = {    // UNTUNED

| | | | | | | | |
|---|---|---|---|---|---|---|---|
| 151, | 152, | 152, | 153, | 154, | 154, | 155, | 156, |
| 157, | 157, | 158, | 159, | 159, | 160, | 161, | 162, |
| 162, | 163, | 164, | 164, | 165, | 166, | 167, | 167, |
| 168, | 169, | 169, | 170, | 171, | 171, | 172, | 173, |
| 174, | 174, | 175, | 176, | 176, | 177, | 178, | 179, |
| 179, | 180, | 181, | 181, | 182, | 183, | 184, | 184, |
| 185, | 186, | 186, | 187, | 188, | 189, | 189, | 190, |
| 191, | 191, | 192, | 193, | 194, | 194, | 195, | 196, |
| 196, | 197, | 198, | 199, | 199, | 200, | 201, | 201, |
| 202, | 203, | 204, | 204, | 205, | 206, | 206, | 207, |
| 208, | 209, | 209, | 210, | 211, | 211, | 212, | 213, |
| 214, | 214, | 215, | 216, | 216, | 217, | 218, | 219, |
| 219, | 220, | 221, | 221, | 222, | 223, | 224, | 224, |
| 225, | 226, | 226, | 227, | 228, | 229, | 229, | 230, |
| 231, | 231, | 232, | 233, | 234, | 234, | 235, | 236, |
| 236, | 237, | 238, | 239, | 239, | 240, | 241, | 241, |
| 242, | 243, | 244, | 244, | 245, | 246, | 246, | 247, |
| 248, | 248, | 249, | 250, | 251, | 251, | 252, | 253, |
| 253, | 254, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255 |

};

TABLE 5 static SHORT sByTbl[512] = {    // UNTUNED

| | | | | | | | |
|---|---|---|---|---|---|---|---|
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 0, | 0, |
| 0, | 0, | 0, | 0, | 0, | 0, | 1, | 1, |
| 2, | 2, | 3, | 3, | 4, | 4, | 5, | 6, |
| 6, | 7, | 7, | 8, | 8, | 9, | 10, | 10, |
| 11, | 11, | 12, | 12, | 13, | 14, | 14, | 15, |
| 15, | 16, | 16, | 17, | 17, | 18, | 19, | 19, |
| 20, | 20, | 21, | 21, | 22, | 23, | 23, | 24, |
| 24, | 25, | 25, | 26, | 26, | 27, | 28, | 28, |
| 29, | 29, | 30, | 30, | 31, | 32, | 32, | 33, |
| 33, | 34, | 34, | 35, | 36, | 36, | 37, | 37, |
| 38, | 38, | 39, | 39, | 40, | 41, | 41, | 42, |
| 42, | 43, | 43, | 44, | 45, | 45, | 46, | 46, |
| 47, | 47, | 48, | 48, | 49, | 50, | 50, | 51, |
| 51, | 52, | 52, | 53, | 54, | 54, | 55, | 55, |

TABLE 5-continued static SHORT sByTbl[512] = {    // UNTUNED

| | | | | | | | |
|---|---|---|---|---|---|---|---|
| 56, | 56, | 57, | 58, | 58, | 59, | 59, | 60, |
| 60, | 61, | 61, | 62, | 63, | 63, | 64, | 64, |
| 65, | 65, | 66, | 67, | 67, | 68, | 68, | 69, |
| 69, | 70, | 70, | 71, | 72, | 72, | 73, | 73, |
| 74, | 74, | 75, | 76, | 76, | 77, | 77, | 78, |
| 78, | 79, | 79, | 80, | 81, | 81, | 82, | 82, |
| 83, | 83, | 84, | 85, | 85, | 86, | 86, | 87, |
| 87, | 88, | 89, | 89, | 90, | 90, | 91, | 91, |
| 92, | 92, | 93, | 94, | 94, | 95, | 95, | 96, |
| 96, | 97, | 98, | 98, | 99, | 99, | 100, | 100, |
| 101, | 101, | 102, | 103, | 103, | 104, | 104, | 105, |
| 105, | 106, | 107, | 107, | 108, | 108, | 109, | 109, |
| 110, | 111, | 111, | 112, | 112, | 113, | 113, | 114, |
| 114, | 115, | 116, | 116, | 117, | 117, | 118, | 118, |
| 119, | 120, | 120, | 121, | 121, | 122, | 122, | 123, |
| 123, | 124, | 125, | 125, | 126, | 126, | 127, | 127, |
| 128, | 129, | 129, | 130, | 130, | 131, | 131, | 132, |
| 133, | 133, | 134, | 134, | 135, | 135, | 136, | 136, |
| 137, | 138, | 138, | 139, | 139, | 140, | 140, | 141, |
| 142, | 142, | 143, | 143, | 144, | 144, | 145, | 145, |
| 146, | 147, | 147, | 148, | 148, | 149, | 149, | 150, |
| 151, | 151, | 152, | 152, | 153, | 153, | 154, | 155, |
| 155, | 156, | 156, | 157, | 157, | 158, | 158, | 159, |
| 160, | 160, | 161, | 161, | 162, | 162, | 163, | 164, |
| 164, | 165, | 165, | 166, | 166, | 167, | 167, | 168, |
| 169, | 169, | 170, | 170, | 171, | 171, | 172, | 173, |
| 173, | 174, | 174, | 175, | 175, | 176, | 177, | 177, |
| 178, | 178, | 179, | 179, | 180, | 180, | 181, | 182, |
| 182, | 183, | 183, | 184, | 184, | 185, | 186, | 186, |
| 187, | 187, | 188, | 188, | 189, | 189, | 190, | 191, |
| 191, | 192, | 192, | 193, | 193, | 194, | 195, | 195, |
| 196, | 196, | 197, | 197, | 198, | 198, | 199, | 200, |
| 200, | 201, | 201, | 202, | 202, | 203, | 204, | 204, |
| 205, | 205, | 206, | 206, | 207, | 208, | 208, | 209, |
| 209, | 210, | 210, | 211, | 211, | 212, | 213, | 213, |
| 214, | 214, | 215, | 215, | 216, | 217, | 217, | 218, |
| 218, | 219, | 219, | 220, | 220, | 221, | 222, | 222, |
| 223, | 223, | 224, | 224, | 225, | 226, | 226, | 227, |
| 227, | 228, | 228, | 229, | 230, | 230, | 231, | 231, |
| 232, | 232, | 233, | 233, | 234, | 235, | 235, | 236, |
| 236, | 237, | 237, | 238, | 239, | 239, | 240, | 240, |
| 241, | 241, | 242, | 242, | 243, | 244, | 244, | 245, |
| 245, | 246, | 246, | 247, | 248, | 248, | 249, | 249, |
| 250, | 250, | 251, | 252, | 252, | 253, | 253, | 254, |
| 254, | 255, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255, |
| 255, | 255, | 255, | 255, | 255, | 255, | 255, | 255 |

};

TABLE 6 static SHORT sRCrTbl[256] = {    // UNTUNED

| | | | | | | | |
|---|---|---|---|---|---|---|---|
| −179, | −178, | −177, | −175, | −174, | −172, | −171, | −170, |
| −168, | −167, | −165, | −164, | −163, | −161, | −160, | −158, |
| −157, | −156, | −154, | −153, | −151, | −150, | −149, | −147, |
| −146, | −144, | −143, | −142, | −140, | −139, | −137, | −136, |
| −135, | −133, | −132, | −130, | −129, | −128, | −126, | −125, |
| −123, | −122, | −121, | −119, | −118, | −116, | −115, | −114, |
| −112, | −111, | −109, | −108, | −107, | −105, | −104, | −102, |
| −101, | −100, | −98, | −97, | −95, | −94, | −93, | −91, |
| −90, | −88, | −87, | −86, | −84, | −83, | −81, | −80, |
| −79, | −77, | −76, | −74, | −73, | −72, | −70, | −69, |
| −67, | −66, | −64, | −63, | −62, | −60, | −59, | −57, |
| −56, | −55, | −53, | −52, | −50, | −49, | −48, | −46, |
| −45, | −43, | −42, | −41, | −39, | −38, | −36, | −35, |
| −34, | −32, | −31, | −29, | −28, | −27, | −25, | −24, |
| −22, | −21, | −20, | −18, | −17, | −15, | −14, | −13, |
| −11, | −10, | −8, | −7, | −6, | −4, | −3, | −1, |
| 0, | 1, | 3, | 4, | 6, | 7, | 8, | 10, |
| 11, | 13, | 14, | 15, | 17, | 18, | 20, | 21, |
| 22, | 24, | 25, | 27, | 28, | 29, | 31, | 32, |
| 34, | 35, | 36, | 38, | 39, | 41, | 42, | 43, |
| 45, | 46, | 48, | 49, | 50, | 52, | 53, | 55, |
| 56, | 57, | 59, | 60, | 62, | 63, | 64, | 66, |
| 67, | 69, | 70, | 72, | 73, | 74, | 76, | 77, |
| 79, | 80, | 81, | 83, | 84, | 86, | 87, | 88, |
| 90, | 91, | 93, | 94, | 95, | 97, | 98, | 100, |
| 101, | 102, | 104, | 105, | 107, | 108, | 109, | 111, |

TABLE 6-continued

| static SHORT sRCrTbl[256] = { | | | | // UNTUNED | | | |
|---|---|---|---|---|---|---|---|
| 112, | 114, | 115, | 116, | 118, | 119, | 121, | 122, |
| 123, | 125, | 126, | 128, | 129, | 130, | 132, | 133, |
| 135, | 136, | 137, | 139, | 140, | 142, | 143, | 144, |
| 146, | 147, | 149, | 150, | 151, | 153, | 154, | 156, |
| 157, | 158, | 160, | 161, | 163, | 164, | 165, | 167, |
| 168, | 170, | 171, | 172, | 174, | 175, | 177, | 178 |
| }; | | | | | | | |

TABLE 7

| static SHORT sGCrTbl[512] = { | | | | // UNTUNED | | | |
|---|---|---|---|---|---|---|---|
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −183, | −183, | −183, | −183, | −183, | −183, | −183, |
| −183, | −181, | −180, | −178, | −177, | −176, | −174, | −173, |
| −171, | −170, | −169, | −167, | −166, | −164, | −163, | −161, |
| −160, | −159, | −157, | −156, | −154, | −153, | −151, | −150, |
| −149, | −147, | −146, | −144, | −143, | −141, | −140, | −139, |
| −137, | −136, | −134, | −133, | −131, | −130, | −129, | −127, |
| −126, | −124, | −123, | −121, | −120, | −119, | −117, | −116, |
| −114, | −113, | −111, | −110, | −109, | −107, | −106, | −104, |
| −103, | −101, | −100, | −99, | −97, | −96, | −94, | −93, |
| −91, | −90, | −89, | −87, | −86, | −84, | −83, | −81, |
| −80, | −79, | −77, | −76, | −74, | −73, | −71, | −70, |
| −69, | −67, | −66, | −64, | −63, | −61, | −60, | −59, |
| −57, | −56, | −54, | −53, | −51, | −50, | −49, | −47, |
| −46, | −44, | −43, | −41, | −40, | −39, | −37, | −36, |
| −34, | −33, | −31, | −30, | −29, | −27, | −26, | −24, |
| −23, | −21, | −20, | −19, | −17, | −16, | −14, | −13, |
| −11, | −10, | −9, | −7, | −6, | −4, | −3, | −1, |
| 0, | 1, | 3, | 4, | 6, | 7, | 9, | 10, |
| 11, | 13, | 14, | 16, | 17, | 19, | 20, | 21, |
| 23, | 24, | 26, | 27, | 29, | 30, | 31, | 33, |
| 34, | 36, | 37, | 39, | 40, | 41, | 43, | 44, |
| 46, | 47, | 49, | 50, | 51, | 53, | 54, | 56, |
| 57, | 59, | 60, | 61, | 63, | 64, | 66, | 67, |
| 69, | 70, | 71, | 73, | 74, | 76, | 77, | 79, |
| 80, | 81, | 83, | 84, | 86, | 87, | 89, | 90, |
| 91, | 93, | 94, | 96, | 97, | 99, | 100, | 101, |
| 103, | 104, | 106, | 107, | 109, | 110, | 111, | 113, |
| 114, | 116, | 117, | 119, | 120, | 121, | 123, | 124, |
| 126, | 127, | 129, | 130, | 131, | 133, | 134, | 136, |
| 137, | 139, | 140, | 141, | 143, | 144, | 146, | 147, |
| 149, | 150, | 151, | 153, | 154, | 156, | 157, | 159, |
| 160, | 161, | 163, | 164, | 166, | 167, | 169, | 170, |
| 171, | 173, | 174, | 176, | 177, | 178, | 180, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181, |
| 181, | 181, | 181, | 181, | 181, | 181, | 181, | 181 |
| }; | | | | | | | |

TABLE 8 static SHORT sGCbTbl[512] = {    // UNTUNED

| | | | | | | | |
|---|---|---|---|---|---|---|---|
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −88, | −88, | −88, | −88, | −88, | −88, | −88, |
| −88, | −87, | −87, | −86, | −85, | −85, | −84, | −83, |
| −83, | −82, | −81, | −80, | −80, | −79, | −78, | −78, |
| −77, | −76, | −76, | −75, | −74, | −74, | −73, | −72, |
| −72, | −71, | −70, | −69, | −69, | −68, | −67, | −67, |
| −66, | −65, | −65, | −64, | −63, | −63, | −62, | −61, |
| −61, | −60, | −59, | −58, | −58, | −57, | −56, | −56, |
| −55, | −54, | −54, | −53, | −52, | −52, | −51, | −50, |
| −50, | −49, | −48, | −47, | −47, | −46, | −45, | −45, |
| −44, | −43, | −43, | −42, | −41, | −41, | −40, | −39, |
| −39, | −38, | −37, | −36, | −36, | −35, | −34, | −34, |
| −33, | −32, | −32, | −31, | −30, | −30, | −29, | −28, |
| −28, | −27, | −26, | −25, | −25, | −24, | −23, | −23, |
| −22, | −21, | −21, | −20, | −19, | −19, | −18, | −17, |
| −17, | −16, | −15, | −14, | −14, | −13, | −12, | −12, |
| −11, | −10, | −10, | −9, | −8, | −8, | −7, | −6, |
| −6, | −5, | −4, | −3, | −3, | −2, | −1, | −1, |
| 0, | 1, | 1, | 2, | 3, | 3, | 4, | 5, |
| 6, | 6, | 7, | 8, | 8, | 9, | 10, | 10, |
| 11, | 12, | 12, | 13, | 14, | 14, | 15, | 16, |
| 17, | 17, | 18, | 19, | 19, | 20, | 21, | 21, |
| 22, | 23, | 23, | 24, | 25, | 25, | 26, | 27, |
| 28, | 28, | 29, | 30, | 30, | 31, | 32, | 32, |
| 33, | 34, | 34, | 35, | 36, | 36, | 37, | 38, |
| 39, | 39, | 40, | 41, | 41, | 42, | 43, | 43, |
| 44, | 45, | 45, | 46, | 47, | 47, | 48, | 49, |
| 50, | 50, | 51, | 52, | 52, | 53, | 54, | 54, |
| 55, | 56, | 56, | 57, | 58, | 58, | 59, | 60, |
| 61, | 61, | 62, | 63, | 63, | 64, | 65, | 65, |
| 66, | 67, | 67, | 68, | 69, | 69, | 70, | 71, |
| 72, | 72, | 73, | 74, | 74, | 75, | 76, | 76, |
| 77, | 78, | 78, | 79, | 80, | 80, | 81, | 82, |
| 83, | 83, | 84, | 85, | 85, | 86, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87, |
| 87, | 87, | 87, | 87, | 87, | 87, | 87, | 87 |

};

TABLE 9 static SHORT sBCbTbl[256] = {    // UNTUNED

| | | | | | | | |
|---|---|---|---|---|---|---|---|
| −227, | −225, | −223, | −222, | −220, | −218, | −216, | −214, |
| −213, | −211, | −209, | −207, | −206, | −204, | −202, | −200, |
| −198, | −197, | −195, | −193, | −191, | −190, | −188, | −186, |
| −184, | −183, | −181, | −179, | −177, | −175, | −174, | −172, |
| −170, | −168, | −167, | −165, | −163, | −161, | −159, | −158, |
| −156, | −154, | −152, | −151, | −149, | −147, | −145, | −144, |
| −142, | −140, | −138, | −136, | −135, | −133, | −131, | −129, |
| −128, | −126, | −124, | −122, | −120, | −119, | −117, | −115, |
| −113, | −112, | −110, | −108, | −106, | −105, | −103, | −101, |
| −99, | −97, | −96, | −94, | −92, | −90, | −89, | −87, |

TABLE 9-continued static SHORT sBCbTbl[256] = {   // UNTUNED

| | | | | | | | |
|---|---|---|---|---|---|---|---|
| −85, | −83, | −82, | −80, | −78, | −76, | −74, | −73, |
| −71, | −69, | −67, | −66, | −64, | −62, | −60, | −58, |
| −57, | −55, | −53, | −51, | −50, | −48, | −46, | −44, |
| −43, | −41, | −39, | −37, | −35, | −34, | −32, | −30, |
| −28, | −27, | −25, | −23, | −21, | −19, | −18, | −16, |
| −14, | −12, | −11, | −9, | −7, | −5, | −4, | −2, |
| 0, | 2, | 4, | 5, | 7, | 9, | 11, | 12, |
| 14, | 16, | 18, | 19, | 21, | 23, | 25, | 27, |
| 28, | 30, | 32, | 34, | 35, | 37, | 39, | 41, |
| 43, | 44, | 46, | 48, | 50, | 51, | 53, | 55, |
| 57, | 58, | 60, | 62, | 64, | 66, | 67, | 69, |
| 71, | 73, | 74, | 76, | 78, | 80, | 82, | 83, |
| 85, | 87, | 89, | 90, | 92, | 94, | 96, | 97, |
| 99, | 101, | 103, | 105, | 106, | 108, | 110, | 112, |
| 113, | 115, | 117, | 119, | 120, | 122, | 124, | 126, |
| 128, | 129, | 131, | 133, | 135, | 136, | 138, | 140, |
| 142, | 144, | 145, | 147, | 149, | 151, | 152, | 154, |
| 156, | 158, | 159, | 161, | 163, | 165, | 167, | 168, |
| 170, | 172, | 174, | 175, | 177, | 179, | 181, | 183, |
| 184, | 186, | 188, | 190, | 191, | 193, | 195, | 197, |
| 198, | 200, | 202, | 204, | 206, | 207, | 209, | 211, |
| 213, | 214, | 216, | 218, | 220, | 222, | 223, | 225 |

};

TABLE 10 static USHORT usR[256] = {   /* 4xR portion of Y calculation, 0-255 */

| loc0 -> | | | | | | | | | | | | | | | |
|---|---|---|---|---|---|---|---|---|---|---|---|---|---|---|---|
| | 1, | 2, | 4, | 5, | 6, | 7, | 8, | 10, | 11, | 12, | 13, | 14, | 16, | 17, | |
| 18, | 19, | 20, | 22, | 23, | 24, | 25, | 26, | 28, | 29, | 30, | 31, | 32, | 33, | 35, | |
| 36, | 37, | 38, | 39, | 41, | 42, | 43, | 44, | 45, | 47, | 48, | 49, | 50, | 51, | 53, | |
| 54, | 55, | 56, | 57, | 59, | 60, | 61, | 62, | 63, | 65, | 66, | 67, | 68, | 69, | 71, | |
| 72, | 73, | 74, | 75, | 77, | 78, | 79, | 80, | 81, | 83, | 84, | 85, | 86, | 87, | 89, | |
| 90, | 91, | 92, | 93, | 94, | 96, | 97, | 98, | 99, | 100, | 102, | 103, | 104, | 105, | 106, | |
| 108, | 109, | 110, | 111, | 112, | 114, | 115, | 116, | 117, | 118, | 120, | 121, | 122, | 123, | 124, | |
| 126, | 127, | 128, | 129, | 130, | 132, | 133, | 134, | 135, | 136, | 138, | 139, | 140, | 141, | 142, | |
| 144, | 145, | 146, | 147, | 148, | 149, | 151, | 152, | 153, | 154, | 155, | 157, | 158, | 159, | 160, | |
| 161, | 163, | 164, | 165, | 166, | 167, | 169, | 170, | 171, | 172, | 173, | 175, | 176, | 177, | 178, | |
| 179, | 181, | 182, | 183, | 184, | 185, | 187, | 188, | 189, | 190, | 191, | 193, | 194, | 195, | 196, | |
| 197, | 199, | 200, | 201, | 202, | 203, | 205, | 206, | 207, | 208, | 209, | 210, | 212, | 213, | 214, | |
| 215, | 216, | 218, | 219, | 220, | 221, | 222, | 224, | 225, | 226, | 227, | 228, | 230, | 231, | 232, | |
| 233, | 234, | 236, | 237, | 238, | 239, | 240, | 242, | 243, | 244, | 245, | 246, | 248, | 249, | 250, | |
| 251, | 252, | 254, | 255, | 256, | 257, | 258, | 260, | 261, | 262, | 263, | 264, | 266, | 267, | 268, | |
| 269, | 270, | 271, | 273, | 274, | 275, | 276, | 277, | 279, | 280, | 281, | 282, | 283, | 285, | 286, | |
| 287, | 288, | 289, | 291, | 292, | 293, | 294, | 295, | 297, | 298, | 299, | 300, | 301, | 303, | 304, | |
| 305 | | | | | | | | | | | | | | | |

};

TABLE 11 static USHORT usG[256] = {   /* 4xG portion of Y calculation, range 0-255 */

| loc 0 -> | | | | | | | | | | | | | | | |
|---|---|---|---|---|---|---|---|---|---|---|---|---|---|---|---|
| | 0, | 2, | 5, | 7, | 9, | 12, | 14, | 16, | 19, | 21, | 23, | 26, | 28, | 31, | |
| 33, | 35, | 38, | 40, | 42, | 45, | 47, | 49, | 52, | 54, | 56, | 59, | 61, | 63, | 66, | |
| 68, | 70, | 73, | 75, | 77, | 80, | 82, | 85, | 87, | 89, | 92, | 94, | 96, | 99, | 101, | |
| 103, | 106, | 108, | 110, | 113, | 115, | 117, | 120, | 122, | 124, | 127, | 129, | 131, | 134, | 136, | |
| 139, | 141, | 143, | 146, | 148, | 150, | 153, | 155, | 157, | 160, | 162, | 164, | 167, | 169, | 171, | |
| 174, | 176, | 178, | 181, | 183, | 185, | 188, | 190, | 193, | 195, | 197, | 200, | 202, | 204, | 207, | |
| 209, | 211, | 214, | 216, | 218, | 221, | 223, | 225, | 228, | 230, | 232, | 235, | 237, | 239, | 242, | |
| 244, | 247, | 249, | 251, | 254, | 256, | 258, | 261, | 263, | 265, | 268, | 270, | 272, | 275, | 277, | |
| 279, | 282, | 284, | 286, | 289, | 291, | 293, | 296, | 298, | 301, | 303, | 305, | 308, | 310, | 312, | |
| 315, | 317, | 319, | 322, | 324, | 326, | 329, | 331, | 333, | 336, | 338, | 340, | 343, | 345, | 348, | |
| 350, | 352, | 355, | 357, | 359, | 362, | 364, | 366, | 369, | 371, | 373, | 376, | 378, | 380, | 383, | |
| 385, | 387, | 390, | 392, | 394, | 397, | 399, | 402, | 404, | 406, | 409, | 411, | 413, | 416, | 418, | |
| 420, | 423, | 425, | 427, | 430, | 432, | 434, | 437, | 439, | 441, | 444, | 446, | 448, | 451, | 453, | |
| 456, | 458, | 460, | 463, | 465, | 467, | 470, | 472, | 474, | 477, | 479, | 481, | 484, | 486, | 488, | |
| 491, | 493, | 495, | 498, | 500, | 502, | 505, | 507, | 510, | 512, | 514, | 517, | 519, | 521, | 524, | |
| 526, | 528, | 531, | 533, | 535, | 538, | 540, | 542, | 545, | 547, | 549, | 552, | 554, | 556, | 559, | |
| 561, | 564, | 566, | 568, | 571, | 573, | 575, | 578, | 580, | 582, | 585, | 587, | 589, | 592, | 594, | |
| 596, | 599 | | | | | | | | | | | | | | |

};

TABLE 12 static UCHAR ucB[256] = {   /* 4xB portion of Y calculation, range 0-255 */

| loc 0 -> | | | | | | | | | | | | | | | |
|---|---|---|---|---|---|---|---|---|---|---|---|---|---|---|---|
| | 0, | 0, | 1, | 1, | 2, | 2, | 3, | 3, | 4, | 4, | 5, | 5, | 5, | | |
| 6, | 6, | 7, | 7, | 8, | 8, | 9, | 9, | 10, | 10, | 10, | 11, | 11, | 12, | 12, | |
| 13, | 13, | 14, | 14, | 15, | 15, | 16, | 16, | 16, | 17, | 17, | 18, | 18, | 19, | 19, | |

TABLE 12-continued static UCHAR ucB[256] = {    /* 4xB portion of Y calculation, range 0-255 */

|  |  |  |  |  |  |  |  |  |  |  |  |  |  |  |  |
|---|---|---|---|---|---|---|---|---|---|---|---|---|---|---|---|
| 20, | 20, | 21, | 21, | 21, | 22, | 22, | 23, | 23, | 24, | 24, | 25, | 25, | 26, | 26, | |
| 26, | 27, | 27, | 28, | 28, | 29, | 29, | 30, | 30, | 31, | 31, | 31, | 32, | 32, | 33, | |
| 33, | 34, | 34, | 35, | 35, | 36, | 36, | 36, | 37, | 37, | 38, | 38, | 39, | 39, | 40, | |
| 40, | 41, | 41, | 41, | 42, | 42, | 43, | 43, | 44, | 44, | 45, | 45, | 46, | 46, | 47, | |
| 47, | 47, | 48, | 48, | 49, | 49, | 50, | 50, | 51, | 51, | 52, | 52, | 52, | 53, | 53, | |
| 54, | 54, | 55, | 55, | 56, | 56, | 57, | 57, | 57, | 58, | 58, | 59, | 59, | 60, | 60, | |
| 61, | 61, | 62, | 62, | 62, | 63, | 63, | 64, | 64, | 65, | 65, | 66, | 66, | 67, | 67, | |
| 67, | 68, | 68, | 69, | 69, | 70, | 70, | 71, | 71, | 72, | 72, | 73, | 73, | 73, | 74, | |
| 74, | 75, | 75, | 76, | 76, | 77, | 77, | 78, | 78, | 78, | 79, | 79, | 80, | 80, | 81, | |
| 81, | 82, | 82, | 83, | 83, | 83, | 84, | 84, | 85, | 85, | 86, | 86, | 87, | 87, | 88, | |
| 88, | 88, | 89, | 89, | 90, | 90, | 91, | 91, | 92, | 92, | 93, | 93, | 93, | 94, | 94, | |
| 95, | 95, | 96, | 96, | 97, | 97, | 98, | 98, | 98, | 99, | 99, | 100, | 100, | 101, | 101, | |
| 102, | 102, | 103, | 103, | 104, | 104, | 104, | 105, | 105, | 106, | 106, | 107, | 107, | 108, | 108, | |
| 109, | 109, | 109, | 110, | 110, | 111, | 111, | 112, | 112, | 113, | 113, | 114, | 114, | 114, | 115, | |
| 115, | 116, | 116 | | | | | | | | | | | | | |

};

TABLE 13 static SHORT sRyTbl[12] = {    /* Cr calculation, .713(r-y) + 128, range -256-255 */

|  |  |  |  |  |  |  |  |  |  |  |  |  |  |  |  |
|---|---|---|---|---|---|---|---|---|---|---|---|---|---|---|---|
| 0, | 0, | 0, | 0, | 0, | 0, | 0, | 0, | 0, | 0, | 0, | 0, | 0, | 0, | 0, | |
| 0, | 0, | 0, | 0, | 0, | 0, | 0, | 0, | 0, | 0, | 0, | 0, | 0, | 0, | 0, | |
| 0, | 0, | 0, | 0, | 0, | 0, | 0, | 0, | 0, | 0, | 0, | 0, | 0, | 0, | 0, | |
| 0, | 0, | 0, | 0, | 0, | 0, | 0, | 0, | 0, | 0, | 0, | 0, | 0, | 0, | 0, | |
| 0, | 0, | 0, | 0, | 0, | 0, | 0, | 0, | 0, | 0, | 0, | 0, | 0, | 0, | 0, | |
| 0, | 0, | 0, | 1, | 2, | 3, | 3, | 4, | 5, | 5, | 6, | 7, | 8, | 8, | 9, | |
| 10, | 10, | 11, | 12, | 12, | 13, | 14, | 15, | 15, | 16, | 17, | 17, | 18, | 19, | 20, | |
| 20, | 21, | 22, | 22, | 23, | 24, | 25, | 25, | 26, | 27, | 27, | 28, | 29, | 30, | 30, | |
| 31, | 32, | 32, | 33, | 34, | 35, | 35, | 36, | 37, | 37, | 38, | 39, | 40, | 40, | 41, | |
| 42, | 42, | 43, | 44, | 45, | 45, | 46, | 47, | 47, | 48, | 49, | 50, | 50, | 51, | 52, | |
| 52, | 53, | 54, | 55, | 55, | 56, | 57, | 57, | 58, | 59, | 60, | 60, | 61, | 62, | 62, | |
| 63, | 64, | 65, | 65, | 66, | 67, | 67, | 68, | 69, | 70, | 70, | 71, | 72, | 72, | 73, | |
| 74, | 75, | 75, | 76, | 77, | 77, | 78, | 79, | 80, | 80, | 81, | 82, | 82, | 83, | 84, | |
| 85, | 85, | 86, | 87, | 87, | 88, | 89, | 89, | 90, | 91, | 92, | 92, | 93, | 94, | 94, | |
| 95, | 96, | 97, | 97, | 98, | 99, | 99, | 100, | 101, | 102, | 102, | 103, | 104, | 104, | 105, | |
| 106, | 107, | 107, | 108, | 109, | 109, | 110, | 111, | 112, | 112, | 113, | 114, | 114, | 115, | 116, | |
| 117, | 117, | 118, | 119, | 119, | 120, | 121, | 122, | 122, | 123, | 124, | 124, | 125, | 126, | 127, | |
| 127, | | | | | | | | | | | | | | | |
| loc0—> 128, | 129, | 129, | 130, | 131, | 132, | 132, | 133, | 134, | 134, | 135, | 136, | 137, | 137, | | |
| 138, | 139, | 139, | 140, | 141, | 142, | 142, | 143, | 144, | 144, | 145, | 146, | 147, | 147, | 148, | |
| 149, | 149, | 150, | 151, | 152, | 152, | 153, | 154, | 154, | 155, | 156, | 157, | 157, | 158, | 159, | |
| 159, | 160, | 161, | 162, | 162, | 163, | 164, | 164, | 165, | 166, | 167, | 167, | 168, | 169, | 169, | |
| 170, | 171, | 171, | 172, | 173, | 174, | 174, | 175, | 176, | 176, | 177, | 178, | 179, | 179, | 180, | |
| 181, | 181, | 182, | 183, | 184, | 184, | 185, | 186, | 186, | 187, | 188, | 189, | 189, | 190, | 191, | |
| 191, | 192, | 193, | 194, | 194, | 195, | 196, | 196, | 197, | 198, | 199, | 199, | 200, | 201, | 201, | |
| 202, | 203, | 204, | 204, | 205, | 206, | 206, | 207, | 208, | 209, | 209, | 210, | 211, | 211, | 212, | |
| 213, | 214, | 214, | 215, | 216, | 216, | 217, | 218, | 219, | 219, | 220, | 221, | 221, | 222, | 223, | |
| 224, | 224, | 225, | 226, | 226, | 227, | 228, | 229, | 229, | 230, | 231, | 231, | 232, | 233, | 234, | |
| 234, | 235, | 236, | 236, | 237, | 238, | 239, | 239, | 240, | 241, | 241, | 242, | 243, | 244, | 244, | |
| 245, | 246, | 246, | 247, | 248, | 248, | 249, | 250, | 251, | 251, | 252, | 253, | 253, | 254, | 255, | |
| 255, | 255, | 255, | 255, | 255, | 255, | 255, | 255, | 255, | 255, | 255, | 255, | 255, | 255, | 255, | |
| 255, | 255, | 255, | 255, | 255, | 255, | 255, | 255, | 255, | 255, | 255, | 255, | 255, | 255, | 255, | |
| 255, | 255, | 255, | 255, | 255, | 255, | 255, | 255, | 255, | 255, | 255, | 255, | 255, | 255, | 255, | |
| 255, | 255, | 255, | 255, | 255, | 255, | 255, | 255, | 255, | 255, | 255, | 255, | 255, | 255, | 255, | |
| 255, | 255, | 255, | 255, | 255, | 255, | 255, | 255, | 255, | 255, | 255, | 255, | 255, | 255, | 255, | |
| 255, | 255 | | | | | | | | | | | | | | |

TABLE 14 static SHORT sRCrTbl[256] = {    /* Cr portion of R calculation, 1.402(Cr - 128, range -128-127) */

|  |  |  |  |  |  |  |  |  |  |  |  |
|---|---|---|---|---|---|---|---|---|---|---|---|
| | −179, | −178, | −177, | −175, | −174, | −172, | −171, | −170, | −168, | −167, | −165, |
| −164, | −162, | −161, | −160, | −158, | −157, | −155, | −154, | −153, | −151, | −150, | −148, |
| −147, | −146, | −144, | −143, | −141, | −140, | −139, | −137, | −136, | −135, | −133, | −132, |
| −130, | −129, | −127, | −126, | −125, | −123, | −122, | −120, | −119, | −118, | −116, | −115, |
| −113, | −112, | −111, | −109, | −108, | −106, | −105, | −104, | −102, | −101, | −99, | −98, |
| −97, | −95, | −94, | −92, | −91, | −90, | −88, | −87, | −85, | −84, | −83, | −81, |
| −80, | −78, | −77, | −76, | −74, | −73, | −71, | −70, | −69, | −67, | −66, | −64, |
| −63, | −62, | −60, | −59, | −57, | −56, | −54, | −53, | −52, | −50, | −49, | −47, |
| −46, | −45, | −43, | −42, | −40, | −39, | −38, | −36, | −35, | −33, | −32, | −31, |
| −29, | −28, | −27, | −25, | −24, | −22, | −21, | −19, | −18, | −17, | −15, | −14, |
| −12, | −11, | −10, | −8, | −7, | −5, | −4, | −3, | −1,loc0>, | 1, | 3, | |
| 4, | 6, | 7, | 8, | 10, | 11, | 13, | 14, | 15, | 17, | 18, | 20, |
| 21, | 22, | 24, | 25, | 27, | 28, | 29, | 31, | 32, | 34, | 35, | 36, |
| 38, | 39, | 41, | 42, | 43, | 45, | 46, | 48, | 49, | 51, | 52, | 53, |
| 55, | 56, | 58, | 59, | 60, | 62, | 63, | 65, | 66, | 67, | 69, | 70, |
| 72, | 73, | 74, | 76, | 77, | 79, | 80, | 81, | 83, | 84, | 86, | 87, |
| 88, | 90, | 91, | 93, | 94, | 95, | 97, | 98, | 100, | 101, | 102, | 104, |

TABLE 14-continued static SHORT sRCrTbl[256] = { /* Cr portion of R calculation, 1.402(Cr - 128, range −128-127) */

| 105, | 107, | 108, | 109, | 111, | 112, | 114, | 115, | 116, | 118, | 119, | 121, |
|---|---|---|---|---|---|---|---|---|---|---|---|
| 122, | 123, | 125, | 126, | 128, | 129, | 130, | 132, | 133, | 134, | 136, | 137, |
| 139, | 140, | 142, | 143, | 145, | 146, | 147, | 149, | 150, | 152, | 153, | 154, |
| 156, | 157, | 159, | 160, | 161, | 163, | 164, | 166, | 167, | 168, | 170, | 171, |
| 173, | 174, | 175, | 177, | 178 | | | | | | | |
| }; | | | | | | | | | | | |

TABLE 15 static SHORT sGCrTbl[256] = { /*Cr portion of G, 2 * .714(Cr −128), range −128-127 */

| | −181, | −181, | −179, | −178, | −176, | −175, | −174, | −172, | −171, | −169, | −168, |
|---|---|---|---|---|---|---|---|---|---|---|---|
| −167, | −165, | −164, | −163, | −161, | −160, | −158, | −157, | −156, | −154, | −153, | −151, |
| −150, | −149, | −147, | −146, | −144, | −143, | −141, | −139, | −138, | −137, | −135, | −134, |
| −132, | −131, | −129, | −128, | −127, | −125, | −124, | −122, | −121, | −120, | −118, | −117, |
| −115, | −114, | −113, | −111, | −110, | −108, | −107, | −106, | −104, | −103, | −101, | −100, |
| −99, | −97, | −96, | −94, | −93, | −92, | −90, | −89, | −87, | −86, | −84, | −83, |
| −81, | −79, | −78, | −77, | −75, | −74, | −72, | −71, | −70, | −68, | −67, | −65, |
| −64, | −63, | −61, | −60, | −58, | −57, | −55, | −54, | −53, | −51, | −50, | −48, |
| −47, | −46, | −44, | −43, | −41, | −40, | −39, | −37, | −36, | −34, | −33, | −32, |
| −30, | −29, | −27, | −25, | −24, | −22, | −21, | −19, | −18, | −17, | −15, | −14, |
| −12, | −11, | −10, | −8, | −7, | −5, | −4, | −3, | −1,loc0>, | | 1, | 3, |
| 4, | 6, | 7, | 8, | 10, | 11, | 13, | 14, | 15, | 17, | 18, | 20, |

TABLE 16 static SHORT sGCbTbl[256] = { /* Cb portion of G, 2 * .344(Cb - 128), range −128-127 */

| | −87, | −87, | −87, | −86, | −85, | −85, | −84, | −83, | −82, | −81, | −81, |
|---|---|---|---|---|---|---|---|---|---|---|---|
| −80, | −80, | −79, | −78, | −78, | −77, | −76, | −76, | −75, | −74, | −73, | −73, |
| −72, | −71, | −71, | −70, | −69, | −69, | −68, | −67, | −66, | −66, | −65, | −64, |
| −64, | −63, | −62, | −62, | −61, | −61, | −60, | −59, | −58, | −57, | −57, | −56, |
| −55, | −55, | −54, | −54, | −53, | −52, | −51, | −51, | −50, | −49, | −49, | −48, |
| −47, | −47, | −46, | −45, | −45, | −44, | −43, | −42, | −42, | −41, | −40, | −40, |
| −39, | −38, | −38, | −37, | −36, | −36, | −35, | −34, | −33, | −33, | −32, | −31, |
| −31, | −30, | −29, | −29, | −28, | −27, | −27, | −26, | −25, | −24, | −24, | −23, |
| −23, | −22, | −21, | −21, | −20, | −19, | −18, | −18, | −17, | −16, | −16, | −15, |
| −14, | −14, | −13, | −12, | −12, | −11, | −10, | −9, | −9, | −8, | −7, | −7, |
| −6, | −5, | −5, | −4, | −3, | −3, | −2, | −1,loc0>, | | 0, | 1, | 2, |
| 2, | 3, | 3, | 4, | 5, | 5, | 6, | 7, | 8, | 8, | 9, | 10, |
| 10, | 11, | 12, | 12, | 13, | 14, | 14, | 15, | 16, | 17, | 17, | 18, |
| 19, | 19, | 20, | 21, | 21, | 22, | 23, | 23, | 24, | 25, | 26, | 26, |
| 27, | 28, | 28, | 29, | 29, | 30, | 31, | 32, | 32, | 33, | 34, | 35, |
| 35, | 36, | 36, | 37, | 38, | 38, | 39, | 40, | 41, | 41, | 42, | 43, |
| 43, | 44, | 45, | 45, | 46, | 47, | 47, | 48, | 49, | 50, | 50, | 51, |
| 52, | 52, | 53, | 54, | 54, | 55, | 56, | 56, | 57, | 58, | 59, | 59, |
| 60, | 61, | 61, | 62, | 62, | 63, | 64, | 65, | 65, | 66, | 67, | 68, |
| 68, | 69, | 69, | 70, | 71, | 71, | 72, | 73, | 74, | 74, | 75, | 76, |
| 76, | 77, | 78, | 78, | 79, | 80, | 80, | 81, | 82, | 83, | 83, | 84, |
| 85, | 85, | 86, | 87, | 87, | | | | | | | |
| }; | | | | | | | | | | | |

TABLE 17 static SHORT sByTbl[512] = { /* Cb calculation, .564(b-y) + 128, range −256-255 */

| 0, | 0, | 0, | 0, | 0, | 0, | 0, | 0, | 0, | 0, | 0, | 0, |
|---|---|---|---|---|---|---|---|---|---|---|---|
| 0, | 0, | 0, | 0, | 0, | 0, | 0, | 0, | 0, | 0, | 0, | 0, |
| 0, | 0, | 0, | 0, | 0, | 0, | 1, | 2, | 2, | 3, | 3, | |
| 4, | 4, | 5, | 6, | 6, | 7, | 7, | 8, | 8, | 9, | 10, | 10, |
| 11, | 11, | 12, | 12, | 13, | 14, | 14, | 15, | 15, | 16, | 16, | 17, |
| 17, | 18, | 19, | 19, | 20, | 20, | 21, | 21, | 22, | 23, | 23, | 24, |
| 24, | 25, | 25, | 26, | 26, | 27, | 28, | 28, | 29, | 29, | 30, | 30, |
| 31, | 32, | 32, | 33, | 33, | 34, | 34, | 35, | 36, | 36, | 37, | 37, |
| 38, | 38, | 39, | 39, | 40, | 41, | 41, | 42, | 42, | 43, | 43, | 44, |
| 45, | 45, | 46, | 46, | 47, | 47, | 48, | 48, | 49, | 50, | 50, | 51, |
| 51, | 52, | 52, | 53, | 54, | 54, | 55, | 55, | 56, | 56, | 57, | 58, |
| 58, | 59, | 59, | 60, | 60, | 61, | 61, | 62, | 63, | 63, | 64, | 64, |
| 65, | 65, | 66, | 67, | 67, | 68, | 68, | 69, | 69, | 70, | 70, | 71, |
| 72, | 72, | 73, | 73, | 74, | 74, | 75, | 76, | 76, | 77, | 77, | 78, |
| 78, | 79, | 79, | 80, | 81, | 81, | 82, | 82, | 83, | 83, | 84, | 85, |
| 85, | 86, | 86, | 87, | 87, | 88, | 89, | 89, | 90, | 90, | 91, | 91, |
| 92, | 92, | 93, | 94, | 94, | 95, | 95, | 96, | 96, | 97, | 98, | 98, |
| 99, | 99, | 100, | 100, | 101, | 101, | 102, | 103, | 103, | 104, | 104, | 105, |
| 105, | 106, | 107, | 107, | 108, | 108, | 109, | 109, | 110, | 111, | 111, | 112, |

TABLE 17-continued static SHORT sByTbl[512] = { /* Cb calculation, .564(b-y) + 128, range −256−255 */

| | | | | | | | | | | | |
|---|---|---|---|---|---|---|---|---|---|---|---|
| 112, | 113, | 113, | 114, | 114, | 115, | 116, | 116, | 117, | 117, | 118, | 118, |
| 119, | 120, | 120, | 121, | 121, | 122, | 122, | 123, | 123, | 124, | 125, | 125, |
| 126, | 126, | 127, | 127, | | | | | | | | |
| loc0−> | 128, | 129, | 129, | 130, | 130, | 131, | 131, | 132, | 133, | 133, | 134, |
| 134, | 135, | 135, | 136, | 136, | 137, | 138, | 138, | 139, | 139, | 140, | 140, |
| 141, | 142, | 142, | 143, | 143, | 144, | 144, | 145, | 145, | 146, | 147, | 147, |
| 148, | 148, | 149, | 149, | 150, | 151, | 151, | 152, | 152, | 153, | 153, | 154, |
| 155, | 155, | 156, | 156, | 157, | 157, | 158, | 158, | 159, | 160, | 160, | 161, |
| 161, | 162, | 162, | 163, | 164, | 164, | 165, | 165, | 166, | 166, | 167, | 167, |
| 168, | 169, | 169, | 170, | 170, | 171, | 171, | 172, | 173, | 173, | 174, | 174, |
| 175, | 175, | 176, | 177, | 177, | 178, | 178, | 179, | 179, | 180, | 180, | 181, |
| 182, | 182, | 183, | 183, | 184, | 184, | 185, | 186, | 186, | 187, | 187, | 188, |
| 188, | 189, | 189, | 190, | 191, | 191, | 192, | 192, | 193, | 193, | 194, | 195, |
| 195, | 196, | 196, | 197, | 197, | 198, | 198, | 199, | 200, | 200, | 201, | 201, |
| 202, | 202, | 203, | 204, | 204, | 205, | 205, | 206, | 206, | 207, | 208, | 208, |
| 209, | 209, | 210, | 210, | 211, | 211, | 212, | 213, | 213, | 214, | 214, | 215, |
| 215, | 216, | 217, | 217, | 218, | 218, | 219, | 219, | 220, | 220, | 221, | 222, |
| 222, | 223, | 223, | 224, | 224, | 225, | 226, | 226, | 227, | 227, | 228, | 228, |
| 229, | 230, | 230, | 231, | 231, | 232, | 232, | 233, | 233, | 234, | 235, | 235, |
| 236, | 236, | 237, | 237, | 238, | 239, | 239, | 240, | 240, | 241, | 241, | 242, |
| 242, | 243, | 244, | 244, | 245, | 245, | 246, | 246, | 247, | 248, | 248, | 249, |
| 249, | 250, | 250, | 251, | 252, | 252, | 253, | 253, | 254, | 254, | 255, | 255, |
| 255, | 255, | 255, | 255, | 255, | 255, | 255, | 255, | 255, | 255, | 255, | 255, |
| 255, | 255, | 255, | 255, | 255, | 255, | 255, | 255, | 255, | 255, | 255, | 255, |
| 255, | 255, | 255, | 255, | 255 | | | | | | | |
| }; | | | | | | | | | | | |

TABLE 18 static SHORT sBCbTbl[256] = { /* Cb portion of B, 1.772(Cb - 128), range −128−127 */

| | | | | | | | | | | | |
|---|---|---|---|---|---|---|---|---|---|---|---|
| −226, | −225, | −223, | −221, | −219, | −218, | −216, | −214, | −212, | −211, | −209, | −207, |
| −205, | −204, | −202, | −200, | −198, | −196, | −195, | −193, | −191, | −189, | −188, | −186, |
| −184, | −182, | −180, | −179, | −177, | −175, | −173, | −172, | −170, | −168, | −166, | −165, |
| −163, | −161, | −159, | −157, | −156, | −154, | −152, | −150, | −149, | −147, | −145, | −143, |
| −141, | −140, | −138, | −136, | −134, | −133, | −131, | −129, | −127, | −126, | −124, | −122, |
| −120, | −118, | −117, | −115, | −113, | −111, | −110, | −108, | −106, | −104, | −102, | −101, |
| −99, | −97, | −95, | −94, | −92, | −90, | −88, | −86, | −85, | −83, | −81, | −79, |
| −78, | −76, | −74, | −72, | −71, | −69, | −67, | −65, | −63, | −62, | −60, | −58, |
| −56, | −55, | −53, | −51, | −49, | −47, | −46, | −44, | −42, | −40, | −39, | −37, |
| −35, | −33, | −32, | −30, | −28, | −26, | −24, | −23, | −21, | −19, | −17, | −16, |
| −14, | −12, | −10, | −8, | −7, | −5, | −3, | −1,loc0>, | 2, | 4, | 5, | |
| 7, | 9, | 11, | 12, | 14, | 16, | 18, | 20, | 21, | 23, | 25, | 27, |
| 28, | 30, | 32, | 34, | 35, | 37, | 39, | 41, | 43, | 44, | 46, | 48, |
| 50, | 51, | 53, | 55, | 57, | 59, | 60, | 62, | 64, | 66, | 67, | 69, |
| 71, | 73, | 74, | 76, | 78, | 80, | 82, | 83, | 85, | 87, | 89, | 90, |
| 92, | 94, | 96, | 98, | 99, | 101, | 103, | 105, | 106, | 108, | 110, | 112, |
| 113, | 115, | 117, | 119, | 121, | 122, | 124, | 126, | 128, | 129, | 131, | 133, |
| 135, | 137, | 138, | 140, | 142, | 144, | 145, | 147, | 149, | 151, | 152, | 154, |
| 156, | 158, | 160, | 161, | 163, | 165, | 167, | 168, | 170, | 172, | 174, | 176, |
| 177, | 179, | 181, | 183, | 184, | 186, | 188, | 190, | 191, | 193, | 195, | 197, |
| 199, | 200, | 202, | 204, | 206, | 207, | 209, | 211, | 213, | 215, | 216, | 218, |
| 220, | 222, | 223, | 225 | | | | | | | | |
| }; | | | | | | | | | | | |

While the invention has been described with reference to a preferred embodiment, it will be understood by those skilled in the art that various changes can be made to the architecture without departing from the spirit and scope of the invention. Accordingly, the invention shall be limited only as specified in the following claims.

I claim:

1. An improved process for transforming a first form of color representation in a first color space and a second form of color representation in a second color space using look-up tables to represent said color representations consisting of the steps of:

a) transforming all colors in said first form of color representation using said look-up tables to said second form of color representation;

b) using said look-up tables to transform all colors in said second form of color representation which have been transformed during said first transforming step back to said first form of color representation;

repeating said steps a) and b) a plurality of times;

comparing the results of each subsequent transformation to the results of previous representations; and where said results do not compare, altering said representations so as to compensate for said non-comparison; and retrying said transformations steps until said transformations do not alter said results.

2. The improved process according to claim 1, further includes the step of creating a set of tuned integer look-up tables for conversion of image data between the first color space and the second color space.

3. An image processor comprising first means for storing images in a first color space, second means for storing images in a second color space, a first storage means for storing a first set of tuned tables which convert an image in the first color space to an image in the second color space, a second storage means for storing a second set of tuned tables which convert an image in said second color space to an image in said first color space, first addressing means for addressing said tables in said first storage means in response to image information received from said first means, said tables in said first storage means providing an output representative of said image information in said second color space, second addressing means for addressing said tables in said second storage means in response to image information received from said second means, said tables in said second storage means providing an output representative of said image information in said first color space, whereby an image can be repetitively converted from one color space to the other with no loss of integrity in the image.

4. A method for creating tables for converting digitally recorded image representations between YCrCb color space and RGB color space comprising the steps of a) creating integer value tables for said RGB and YCrCb color spaces;

b) converting each point of said RGB color spacing using RGB tables to the corresponding point in said YCrCb color space and converting said corresponding point back to a point in said RGB color space using said tables;

c) repeating said converting step n times, n being an integer;

d) comparing points obtained during said nth conversion cycle to corresponding points obtained during said nth−1 conversion cycle and identifying those points which differ;

e) altering points in said tables which differed between the nth and nth−1 cycles so as to compensate for said differences; and f) repeating said steps b) to e) with the altered tables until said converting steps provides the same points after each conversion so that images may be repetitively stored and displayed without deterioration of the image.

5. The method according to claim 4, further includes the step of creating a set of tuned integer look-up tables for conversion of image data between the YCrCb color space and the RGB color space.

* * * * *